(12) United States Patent
van Lenthe et al.

(10) Patent No.: US 7,217,379 B2
(45) Date of Patent: May 15, 2007

(54) THERMOPLASTIC TUBE

(75) Inventors: Arjan Dirk van Lenthe, Schuinesloot (NL); Jan Hendrik Prenger, Hardenberg (NL); Jan Visscher, Lutten (NL)

(73) Assignee: Wavin B.V. (NL)

( * ) Notice: Subject to any disclaimer, the term of this patent is extended or adjusted under 35 U.S.C. 154(b) by 208 days.

(21) Appl. No.: 10/781,679

(22) Filed: Feb. 20, 2004

(65) Prior Publication Data

US 2005/0062182 A1 Mar. 24, 2005

Related U.S. Application Data

(62) Division of application No. 09/940,626, filed on Aug. 29, 2001, now Pat. No. 6,726,863.

(51) Int. Cl.
*B29C 47/92* (2006.01)
*B29C 47/08* (2006.01)

(52) U.S. Cl. ............. 264/40.7; 264/209.3; 264/211.12; 264/290.2

(58) Field of Classification Search ...................... None
See application file for complete search history.

(56) References Cited

U.S. PATENT DOCUMENTS

| | | | |
|---|---|---|---|
| 3,264,383 A | 8/1966 | Niessner et al. | |
| 4,036,930 A | 7/1977 | Murai et al. | |
| RE31,133 E | 1/1983 | Niessner et al. | |
| 4,444,702 A | 4/1984 | Thomas et al. | |
| 4,515,738 A | 5/1985 | Anders | |
| 4,551,289 A | 11/1985 | Schwab et al. | |
| 4,663,107 A | 5/1987 | Takada et al. | |
| 4,740,146 A | 4/1988 | Angelbeck | |
| 4,749,531 A | 6/1988 | Börger et al. | |
| 4,882,104 A | 11/1989 | Dobrowsky | |
| 4,904,431 A | 2/1990 | O'Maleki | |
| 5,049,223 A | 9/1991 | Dais et al. | |
| 5,096,634 A | 3/1992 | Tsadares et al. | |
| 5,128,077 A | 7/1992 | Stevenson et al. | |

(Continued)

FOREIGN PATENT DOCUMENTS

DE 2 357 210 11/1973

(Continued)

OTHER PUBLICATIONS

XP-002139867, 1977, Toshiba Machine Co. Ltd.

(Continued)

*Primary Examiner*—Mark Eashoo
(74) *Attorney, Agent, or Firm*—Blank Rome LLP

(57) ABSTRACT

A method for producing a tube section from thermoplastic material, in which a tube section is extruded by means of an extruder which is provided with an extruder die having an inner core, which inner core defines an axial hollow space in the tube section, the tube section coming out of the extruder die downstream of the extruder die being internally cooled by means of an internal cooling member and externally cooled by means of an external cooling device.

Immediately after the tube section leaves the extruder die, the internal cooling member brings about internal cooling of the tube. The external cooling device is positioned downstream of the internal cooling member, so that the external cooling of the tube section is brought about after the internal cooling.

6 Claims, 12 Drawing Sheets

U.S. PATENT DOCUMENTS

| | | | |
|---|---|---|---|
| 5,725,814 A | 3/1998 | Harris | |
| 5,817,270 A * | 10/1998 | Prenger et al. | 264/290.2 |
| 5,911,933 A * | 6/1999 | Prenger et al. | 264/209.3 |
| 5,942,171 A | 8/1999 | Prenger | |
| 6,053,214 A | 4/2000 | Sjoberg et al. | |
| 6,214,283 B1 * | 4/2001 | Visscher et al. | 264/558 |
| 6,726,863 B2 * | 4/2004 | van Lenthe et al. | 264/40.7 |

FOREIGN PATENT DOCUMENTS

| | | |
|---|---|---|
| EP | 0 627 295 | 7/1994 |
| GB | 1 589 052 | 5/1981 |
| JP | 62140816 | 6/1987 |
| JP | 04053729 | 2/1992 |
| JP | 4053729 | 2/1992 |
| JP | 5329926 | 12/1993 |
| JP | 09123246 | 5/1997 |
| WO | WO 90/02644 | 3/1990 |
| WO | WO 95/25626 | 9/1995 |
| WO | WO 96/34733 | 11/1996 |
| WO | WO 97/33739 | 8/1997 |
| WO | WO 98/09796 | 3/1998 |
| WO | WO 98/35814 | 8/1998 |

OTHER PUBLICATIONS

XP 002139868, 1978, Komatsu Kasei KK.

* cited by examiner

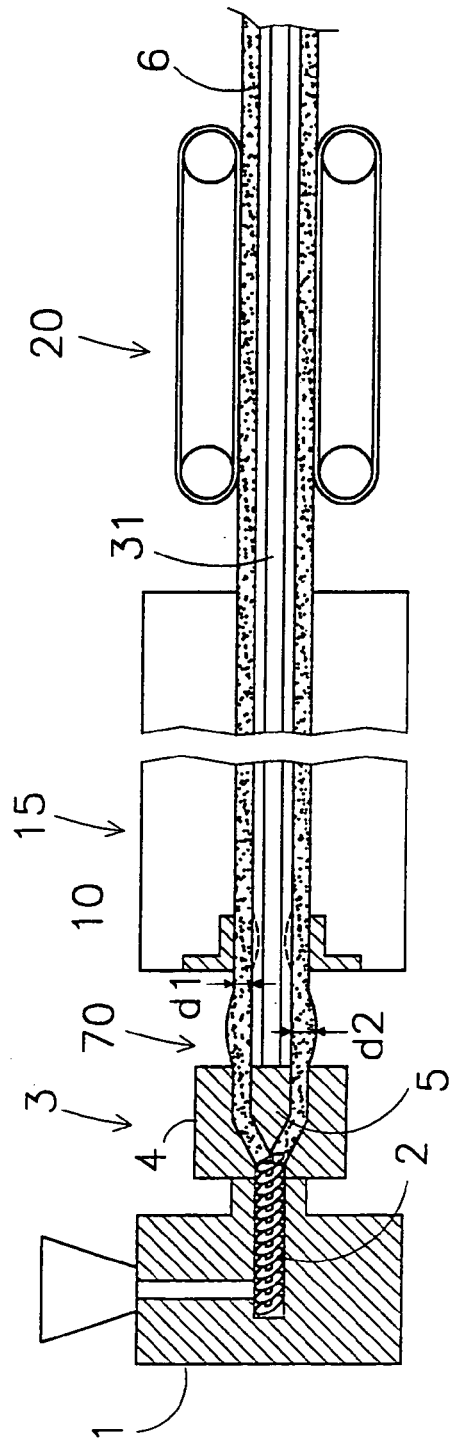
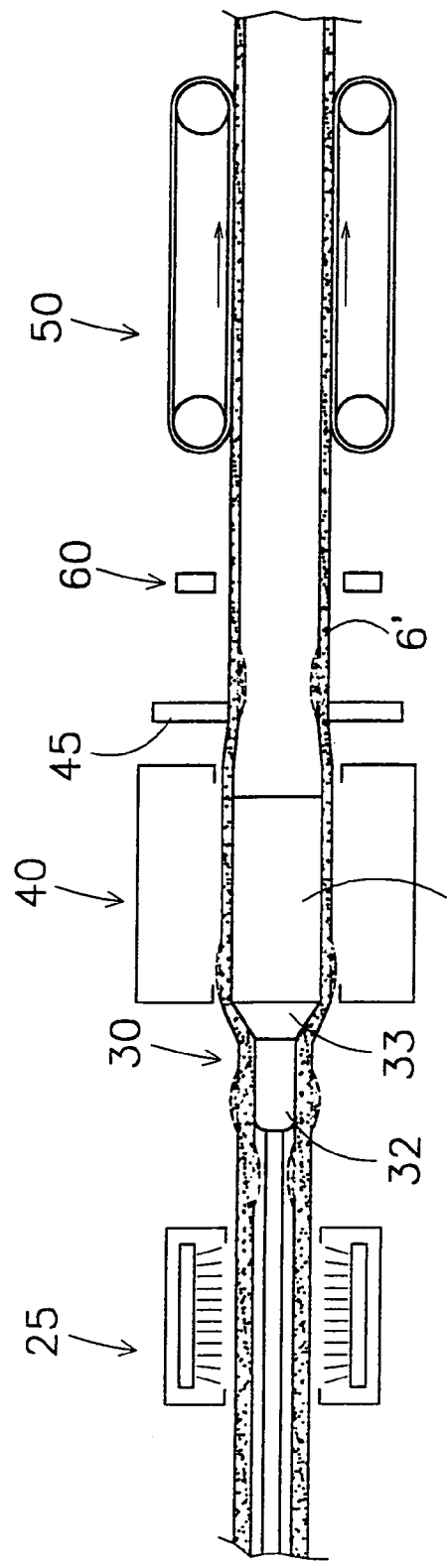
Fig 1a
Fig 1b

THERMOPLASTIC TUBE

CROSS-REFERENCE TO RELATED APPLICATIONS

This application is a divisional application of U.S. application Ser. No. 09/940,626, now U.S. Pat. No. 6,726,863, filed Aug. 29, 2001.

FIELD OF THE INVENTION

The invention relates to the production of tube from thermoplastic material, in particular from polyolefin plastic material, such as polyethylene. The invention also relates to the production of plastic tube in which the thermoplastic material is biaxially oriented, which process is known as the biaxial stretching process. The invention also relates to improvements to the process for the production of extruded tube from thermoplastic material, which process may form part of the production of biaxially oriented plastic tube. The invention additionally relates to the production of an improved joint between tubes made from biaxially oriented thermoplastic material.

The present invention relates in particular to the production of a tube from biaxially oriented thermoplastic material with an integrally formed socket at an end, so that tubes of this nature can be coupled to one another via socket joints, in order in this way to form a pipe, for example for transporting water, gas, etc.

BACKGROUND OF THE INVENTION

WO 95/25626 has disclosed a method for the production of biaxially oriented plastic tube, also known as a stretched tube. In this method, the stretched tube is of uniform cross section, i.e. has a uniform wall thickness and diameter, over its entire length, and is also uniformly stretched in the axial and tangential (circumferential) direction of the tube over its entire length. A method for providing a tube which has been produced in this way with a socket at one of its ends is known from WO 97/33739.

Another method for producing tube from biaxially oriented plastics material is known from GB 1 589 052. This method is based on a tube made from thermoplastic material which has not been subjected to biaxial orientation, which tube has a tube body with, at one end, an end part with a greater wall thickness than the tube body. The tube is placed in a die and is expanded by an internal pressure so that the plastics material of the tube is biaxially oriented. In the process, the end part is deformed to form a socket.

WO 98/13190 has described yet another method for the production of a tube with an integral socket from biaxially oriented thermoplastic material.

Despite all the developments in the field of the production of tubes from biaxially oriented thermoplastic material, and in particular in the field of forming a socket on a tube of this nature, load tests still show that the socket of a tube of this nature forms the critical part of the tube. This is because the tube has been found to rupture earlier at the socket than in the tube body, and therefore the socket constitutes an undesirable limitation on the mechanical strength of the tube.

OBJECT OF THE INVENTION

The object of the present invention is to propose measures which make it possible to produce a tube of the above type with an integral socket at one or both ends. The invention also provides measures for improving the spigot of the tube, which is to be fitted into a socket.

SUMMARY OF THE INVENTION

For this purpose, the invention, according to a first aspect, provides a method wherein—by periodical variation of the ratio of the preform advancement speed, on the one hand, and the output of the extruder, on the other hand, between a plurality of different values—the wall thickness of the preform is periodically changed.

When the method according to the first aspect of the invention is carried out, an axial preform part with a different wall thickness from the preceding part of the preform is periodically formed in the section between the extruder die and the tube speed-control means, in practice in particular immediately downstream of the extruder die.

Surprisingly, in practice it has proven possible to control the process of biaxial stretching of the preform successfully despite the variation in the wall thickness of the preform which is to be forced over the mandrel. In particular, it has proven possible for a preform part with a greater wall thickness to be forced over the mandrel without this having undesirable effects on that part of the preform which has a smaller wall thickness and is located between the said thick preform part and the drawing device.

The method according to the first aspect of the invention enables a stretched tube of biaxially oriented thermoplastic material to be produced in a continuous process with axial tube parts which have varying wall thicknesses.

In practice, it has proven expedient for the maximum wall thickness of the preform to be 5–15% greater than the smallest wall thickness of the preform, as seen at a location immediately downstream of the extruder die. It will be clear that other values also lie within the scope of the invention.

Preferably, the transition from one wall thickness value to another wall thickness value is gradual. This is of benefit to the stability of the process.

In a preferred embodiment, the ratio between the advancement speed of the preform, which is determined by the tube speed-control means, on the one hand, and the output of the extruder, on the other hand, is to be at a substantially constant first value for a first period and to be at one or more values which differ from the first value for a second period, which is considerably shorter than the first period, which cycle is repeated continuously.

In practice, this means, as seen at a point downstream of the expansion mandrel—the stretched tube in each case has a part of great axial length with a uniform first wall thickness and associated diameter, which part is followed by a considerably shorter axial part of the tube in which the wall thickness differs from the said first wall thickness, in particular is of one or more greater values, as seen in the axial direction of the said shorter part. In particular, there is provision for the wall thickness—as seen in the axial direction—to vary between a plurality of values in the latter axial part, so that annular areas which adjoin one another and have different wall thicknesses can be distinguished in the relevant part of the stretched tube.

The method according to the first aspect of the invention can be implemented by periodically varying the output of the extruder, in which case the advancement speed of the preform which is determined by the tube speed-control means is kept substantially constant. This does require an extruder which can be adjusted within a suitable range in terms of its output.

However, the method according to the first aspect of the invention can also be implemented, as is preferred, by keeping the output of the extruder substantially constant and periodically varying the advancement speed of the preform which is determined by the tube speed-control means.

In a preferred embodiment of the method according to the first aspect of the invention, the stretched tube acquires substantially the same axial stretching over its entire length. To achieve this, in the preferred embodiment of the method it is in some cases sufficient to keep the advancement speed of the stretched tube downstream of the mandrel, which is determined by the drawing device, constant, so that the ratio of the advancement speed of the stretched tube downstream of the mandrel, on the one hand, and of the preform upstream of the mandrel, on the other hand, remains substantially constant.

In another preferred embodiment of the method, the advancement speed of the preform upstream of the mandrel, which is determined by the tube speed-control means, varies, and for this reason it is then necessary for the advancement speed of the stretched tube downstream of the mandrel, which is determined by the drawing device, to be varied periodically in such a manner that the ratio of the advancement speed of the tube downstream of the mandrel, on the one hand, and of the preform upstream of the mandrel, on the other hand, is kept substantially constant.

In a variant of the method according to the first aspect of the invention, there is provision for the tube parts with a greater wall thickness not to have the same level of axial stretching as an intervening tube part with a smaller wall thickness, but rather to have a greater level of axial stretching. For this purpose, in the period during which a part of the preform with a greater wall thickness is being forced over the mandrel, or during a section of this period, the ratio of the advancement speed of the stretched tube which is determined by the drawing device, on the one hand, and the advancement speed of the preform which is determined by the tube speed-control means, on the other hand, is greater than in the period during which a part of the preform with a smaller wall thickness is being forced over the mandrel, in such a manner that a tube part having the greater wall thickness acquires a greater level of axial stretching than a tube part with a smaller wall thickness.

To enable the method according to the first aspect of the invention, and in particular according to the variant described above, to be controlled successfully, it is desirable for the tube to undergo its axial stretching in an accurately defined section and, outside this section, for no further, additional axial stretching to be generated in the tube. To achieve this, an advantageous embodiment of the method according to the first aspect of the invention provides for the stretched tube downstream of the expansion part of the mandrel to be cooled in such a manner that the cooled tube no longer undergoes any axial stretching and the generation of the axial stretching is concentrated in the section between the tube speed-control means arranged in the vicinity of the extruder and the downstream end of the mandrel. Preferably, the axial stretching is realized between two tube speed-control means which are arranged at a distance from one another and are both arranged between the extruder and the mandrel.

It will be clear that at the moment at which a preform part with a thickened wall arrives at the upstream end of the mandrel, a possibly critical change occurs in the hitherto stable condition of the method, in particular if the thickened wall part of the preform projects inwards at that moment and thus has a smaller diameter than the adjoining parts of the preform. It would then be expected that the preform part with the greater wall thickness would, as it were, jam on the mandrel, while the thin and still hot part of the preform located immediately downstream of this part would be additionally stretched in the axial direction, possibly to an unacceptable extent.

To solve this problem, in an embodiment of the method according to the first aspect of the invention which is advantageous in practice, the temperature of the preform is controlled in such a manner that a preform part with a greater wall thickness is on average at a higher temperature, measured at a location immediately upstream of the mandrel, than a preform part of a smaller wall thickness which adjoins this part immediately downstream and is therefore already on the mandrel.

If it is assumed that the temperature conditioning substantially consists in cooling the preform, although it is also known from the prior art to supply (relatively small) amounts of heat to the preform upstream of the mandrel, the above-described temperature condition of the preform can in practice be implemented by causing the cooling means, which form part of the temperature-control means, to operate substantially constantly. This can be explained in the following way. In the section between the extruder die and the mandrel it is in fact possible to distinguish between three partial sections. In the first partial section which immediately adjoins the extruder die, it is possible to produce a preform part with a thickened wall. In the adjoining partial section, the preform is subjected to the action of the temperature-conditioning means, in particular to cooling, and in the adjoining third partial section, there is in fact no significant thermal energy supplied to or removed from the preform.

In a preferred embodiment of the method, a preform part with a thickened wall which is formed in the first partial section will move past the temperature-conditioning means in the second section at the same speed as a preform part with a smaller wall thickness. In relative terms, the thicker preform part will therefore be cooled to a lesser extent and will therefore arrive at the mandrel at a higher average temperature; in particular, the temperature of the core of the said thickened preform part will be higher. Due to the higher temperature, the modulus of elasticity will be lower and the thickened preform part will therefore be easier to deform, in relative terms, a fact which in practice can sufficiently compensate for the wall thickening to avoid the above critical situation.

In another preferred embodiment of the method, the speed of the preform is reduced while a preform part with a thickened wall is being formed. In this case too, the said preform part will form in the first partial section. Due to the reduction in speed, that part of the preform which is situated in the second partial section during this period will be subjected to cooling for a longer time than that part of the preform which has already passed through the cooling and is in the third partial section. When the preform part with a thickened wall is complete, the speed of the preform is increased again and the preform part with a thickened wall will pass through the cooling at the said higher speed and will thus be cooled to a lesser extent. When the thickened preform part then arrives at the mandrel, the said part can be deformed easily, while the thin wall part of the preform which is located immediately downstream thereof is in fact relatively rigid. A combination of the two effects makes it possible to carry out the process successfully in a controllable manner.

It can be seen from the above that, on the basis of the temperature of the preform—within a temperature range which is suitable for obtaining biaxial orientation—and the resultant modulus of elasticity of the plastics material of the preform, it is possible to control the axial stretching of the preform. By causing the preform to be at a higher temperature locally, for example at a thicker part thereof as described above, than other parts of the preform at the time of axial stretching, it is possible to ensure that, given a constant axial stretching force exerted on the preform, the hotter part undergoes greater axial stretching than the cooler parts, even if this hotter part has a greater wall thickness. In a practical embodiment, it is possible for the thinner parts of the preform to be at a temperature of approximately 90° C. and for a hotter, optionally thicker, part to be at a temperature in the vicinity of 120° C.

Surprisingly, it has proven possible to pass the tube through an external calibration device after it has passed the expansion mandrel. In this case, it can be observed that the thickened tube part, on leaving the mandrel, projects outwards with respect to the adjoining parts of the tube and is then pressed inwards by the external calibration device.

The method according to the first aspect of the invention can be carried out in a continuous process, and in this way it is possible to produce a tube from biaxially oriented thermoplastic material with a tube part with a thickened wall at (regular) axial intervals from one another. By then sawing, cutting or suchlike through the tube at the location of the thickened tube parts, it is possible to produce tube sections with, at one or both ends, an end part with a larger wall thickness than the tube body. Furthermore, the invention provides for the said tube sections then to be subjected to a socket-forming operation, in which case an integral socket is formed from an end part with a thickened wall. In a variant—if both end parts are of thicker design—one end part is deformed into a socket and the other end part is used as a spigot. If appropriate, the said spigot is also deformed further, for example is provided with one or more formations, in such a manner that a positively locking socket joint can be obtained.

In a practical embodiment, the tube section has a tube body of uniform cross section and wall thickness with, at one end, an integral socket and, at the other end, a spigot with a wall thickness which is 3–10% greater than the tube body.

Particularly in those embodiments in which the end part with a thickened wall—prior to the formation of the socket—has undergone axial stretching which is greater than or equal to the tube body with a smaller wall thickness, the socket obtained has proven to have considerably better properties and a greater load-bearing capacity than the known sockets on such tubes.

Preferably, after the socket has been formed, the axial stretching of the socket is greater than or equal to the axial stretching of the tube body.

Further advantageous embodiments of the method according to the first aspect of the invention are described in the claims and the description.

A second aspect of the present invention relates to a method for producing a tube from biaxially oriented thermoplastic material, which tube has a tube body and, at one or both ends thereof, an integrally formed socket, in which method a prefabricated tube of biaxially oriented thermoplastic material is subjected to a socket-forming operation.

The second aspect of the invention provides for the prefabricated tube to have an end part with a greater wall thickness than the tube body, the axial stretching of the end part prior to the socket-forming operation being equal to or preferably greater than the axial stretching of the tube body. It will be clear that a tube of this nature can be produced using the method according to the first aspect of the invention.

The shape of the socket may be complicated, for example with circumferential ribs of different diameters which, on the inside of the tube, form circumferential areas of different diameters. It is also possible for the wall thickness of the socket, as seen in the longitudinal direction of the tube, to vary and at suitable, e.g. heavily loaded, locations to be thicker than at other locations.

In one possible embodiment, the end part of the prefabricated tube—as seen from its end face—has a plurality of annular areas which adjoin one another and have a wall thickness which fluctuates from one annular area to the next annular area, in which case in a plurality of annular areas the wall thickness is greater than the wall thickness of the tube body. The wall thickness of the end part may thus be of a plurality of values which differ from the wall thickness of the tube body, depending on the socket-forming operation which is yet to be carried out and the requirements which are imposed on the socket.

In a preferred embodiment, an annular area with a greater wall thickness than the tube body is deformed, during the socket-forming operation, into an outwardly bulging groove wall which delimits an internal groove in the tube, which is adapted to accommodate a sealing ring.

A third aspect of the invention relates to the production of a tube from biaxially oriented thermoplastic material, wherein a tubular preform having a wall thickness is extruded from thermoplastic material using an extruder which is provided with an extruder die having an inner core, the inner core defining a hollow space in the preform, wherein the preform is subjected to a temperature conditioning of the preform, so that a tempered preform is obtained having an orientation temperature which is suitable for the thermoplastic material of said preform, and wherein the tempered preform is forced over a mandrel, which mandrel comprises an expansion part, which brings about expansion in the circumferential direction of the preform forced over said mandrel, in such a manner that said preform is transformed into a biaxially oriented tube with thermoplastic material which is oriented in the axial direction and the circumferential direction of the tube, wherein said biaxially oriented tube is cooled, which method comprises the use of multiple preform speed-control means which act on the preform and are arranged at a distance from one another between the extruder and the expansion part of the mandrel, which preform speed-control means each maintain an associated preform advancement speed of the preform, in such a manner that the preform, in between the said preform speed-control means, is axially stretched, thereby reducing the wall thickness of the preform, which method further comprises the use of a drawing device which acts on the tube downstream of the mandrel, which drawing device sets an adjustable tube advancement speed of the tube downstream of the mandrel.

In this known method, at least part of the desired axial stretching of the tube has already been brought about in the preform, before the preform is moved over the expansion mandrel. Then, as it passes over the mandrel, the desired stretching in the circumferential direction is produced, as well as any remaining part of the axial stretching.

In a known method, for example as described in WO 97/10096, two speed-control means, in the form of generally known drawing devices, are arranged upstream of the mandrel, in which case the speed-control means in the vicinity of the mandrel imparts a higher advancement speed to the preform than the other speed-control means. This leads to axial stretching of the preform with reduction of the wall thickness of the preform. In practice, however, this known method of axial stretching has proven insufficiently controllable, with the result that undesirable variations may arise in the preform. Variations of this nature, for example in the cross-sectional shape of the preform, constitute a drawback when the preform subsequently passes over the mandrel.

The third aspect of the invention provides improved control of the axial stretching described above.

According to the third aspect of the invention, the preform, in the section between the speed-control means, in which the preform is axially stretched, is moved through a calibration opening of a calibration device, which calibration device reduces the external diameter of the preform. As a result, the preform acquires an accurately controllable external diameter before the preform reaches the downstream speed-control means and subsequently passes over the expansion mandrel. Furthermore, a significant level of axial stretching can be produced in this section combined with a high level of stability and controllability of the process.

A fourth aspect of the invention relates to a method for producing a biaxially oriented tube from thermoplastic material, in particular polyolefin plastics material, wherein a tubular preform is extruded from thermoplastic material using an extruder which is provided with an extruder die having an inner core, the inner core defining an axial hollow space in the preform, wherein the preform is subjected to a temperature conditioning of the preform, so that a tempered preform is obtained having an orientation temperature which is suitable for the thermoplastic material of said preform, and wherein the tempered preform is forced over a dimensionally stable mandrel, which mandrel comprises an expansion part having an outer surface which substantially corresponds to the surface of a truncated cone, which mandrel brings about expansion of the tempered preform in the circumferential direction of the tempered preform forced over said mandrel, in such a manner that said preform is transformed into a biaxially oriented tube with thermoplastic material which is oriented in axial direction and in circumferential direction of the tube, wherein said biaxially oriented tube is cooled, the method comprising the use of a preform speed-control means which acts on the preform upstream of the mandrel and of a drawing device which is arranged downstream of the mandrel and acts on the tube.

In this known method, the passage of the preform over the expansion part of the mandrel constitutes a problematical part of the production of the tube. In particular, the preform has exhibited undesirable deformations during this part of the production process.

The fourth aspect of the invention seeks to promote the stability of the preform as it passes over the mandrel.

The invention achieves this objective by providing a method, in which the outer surface of the expansion part of the mandrel is provided, at a plurality of locations around the circumference of the expansion part, with elongate grooves and/or ribs which extend in the axial direction, and a film of liquid preferably being formed between the expansion part of the mandrel and the tube.

In an advantageous embodiment, the expansion part of the mandrel is provided with axial grooves which are formed at regular angular intervals, preferably of between 3° and 10°, in the outer surface of the expansion part, and in which the grooves are preferably at most 5 millimeters deep, particularly preferably between 0.5 and 3 millimeters deep.

A fifth aspect of the invention relates to a method for producing a biaxially oriented tube from thermoplastic material, in particular polyolefin plastics material, wherein a tubular preform is extruded from thermoplastic material using an extruder which is provided with an extruder die having an inner core, the inner core defining an axial hollow space in the preform, wherein the preform is subjected to a temperature conditioning of the preform, so that a tempered preform is obtained having an orientation temperature which is suitable for the thermoplastic material of said preform, and wherein the tempered preform is forced over a dimensionally stable mandrel, which mandrel comprises an expansion part having an outer surface which substantially corresponds to the surface of a truncated cone, which mandrel brings about expansion of the tempered preform in the circumferential direction of the tempered preform forced over said mandrel, in such a manner that said preform is transformed into a biaxially oriented tube with thermoplastic material which is oriented in axial direction and in circumferential direction of the tube, wherein said biaxially oriented tube is cooled, the method comprising the use of a preform speed-control means which acts on the preform upstream of the mandrel and of a drawing device which is arranged downstream of the mandrel and acts on the tube.

As is generally known, to force the preform over the mandrel, a considerable tensile force has to be exerted on the stretched tube downstream of the mandrel. When this tensile force is being exerted, it is fundamentally undesirable for the stretched tube to be damaged or permanently deformed.

The fifth aspect of the invention provides for the possibility of exerting a high tensile force by arranging a plurality of drawing devices which drive the stretched tube at the same speed one behind the other downstream of the mandrel.

Also, according to the fifth aspect of the invention, the tube is internally supported at the location where a drawing device, arranged downstream of the mandrel, acts, preferably with the aid of mechanical support means which, at the location where the drawing device acts, comprise one or more support surfaces which move with the tube and bear against the inside of the tube, which support means are preferably attached to the inner core of the extruder.

Preferably, the support surfaces of the support means are driven in the direction of advancement of the tube.

In a variant, it is permissible for the stretched tube to be deformed by the drawing device, namely, in particular, if that part of the tube on which the said device acts subsequently no longer forms part of the tube which is to be marketed. For this purpose, therefore, it is possible for a drawing device to comprise one or more tube-engagement members which can each be moved to and fro over an axial distance, preferably approximately the length of a tube which is to be marketed, and act on part of the tube, so as to deform the tube, and grip the tube securely at that location, each tube-engagement member being assigned an axial displacement mechanism in order to displace the said member and the tube which is secured therein in the axial direction.

The present application also relates to a further number of aspects, which are described in the following paragraphs.

A method for producing a tube section from thermoplastic material, in which a tube section is extruded using an extruder which is provided with an extruder die having an inner core, which inner core defines an axial hollow space in the tube section, in which the tube section coming out of the extruder die, downstream of the extruder die, is internally cooled by means of an internal cooling member, and is externally cooled by means of an external cooling device, in which the internal cooling member internally cools the tube immediately after the tube section has left the extruder die, in which the internal cooling member has a dimensionally stable outer wall with an axial length which is a multiple of the cross-sectional dimension of the tube section, and in which cooling liquid is pressed between the dimensionally stable outer wall and the tube section, in such a manner that a quick-flowing film of liquid is produced between the tube section and the dimensionally stable outer wall, the liquid flowing in the countercurrent direction, i.e. counter to the direction of extrusion, and the film of liquid preferably being at most 3 millimeters thick.

A method for producing a tube section from thermoplastic material, in which a tube section is extruded using an extruder which is provided with an extruder die having an inner core, which inner core defines an axial hollow space in the tube section, in which the tube section coming out of the extruder die, downstream of the extruder die, is internally cooled by means of an internal cooling device which comprises an internal cooling member situated inside the extruded tube, and is externally cooled by means of an external cooling device, the internal cooling member being designed to produce direct contact between a cooling liquid and the tube section, the internal cooling device comprising deaerating means for deaerating the cooling liquid, by means of which the cooling liquid is deaerated before it is fed to the internal cooling member.

A method for producing a tube section from thermoplastic material, in which a tube section is extruded using an extruder which is provided with an extruder die having an inner core, which inner core defines an axial hollow space in the tube section, in which the tube section coming out of the extruder die, downstream of the extruder die, is internally cooled by means of an internal cooling device which comprises an internal cooling member situated inside the extruded tube, and is externally cooled by means of an external cooling device, the internal cooling member being designed to produce direct contact between a cooling liquid and the tube section, the internal cooling member being designed to produce a helical flow of the cooling liquid along the inner wall of the tube section.

A method for producing a tube section from thermoplastic material, in which a tube section is extruded using an extruder which is provided with an extruder die having an inner core, which inner core defines an axial hollow space in the tube section, in which the tube section coming out of the extruder die, downstream of the extruder die, is internally cooled by means of a cooling liquid which is brought into direct contact with the tube section, and is externally cooled by means of an external cooling device, a cooling liquid with a low surface tension being used, the cooling liquid preferably being water to which one or more additives which reduce the surface tension have been added.

A method for producing a tube section from a polyolefin plastics material, in which a tube section is extruded using an extruder which is provided with an extruder die having an inner core, which inner core defines an axial hollow space in the tube section, in which the tube section coming out of the extruder die, downstream of the extruder die, is internally cooled by means of an internal cooling device which comprises an internal cooling member attached to the inner core, and is externally cooled by means of an external cooling device, a heating medium being present in the hollow space in the tube section downstream of the internal cooling member, for the purpose of increasing the temperature of the layer on the inside of the tube section which has been cooled by the internal cooling member, the heating medium preferably being a liquid, if appropriate with an added substance which reduces the surface tension, at a temperature of between 90 and 100° C.

A method for producing a tube section having a wall layer made from crystalline thermoplastic material, in which a tube section is extruded using an extruder which is provided with an extruder die having an inner core, which inner core defines an axial hollow space in the tube section, in which the tube section coming out of the extruder die, downstream of the extruder die, is internally cooled by means of an internal cooling device which comprises an internal cooling member situated in the tube, and is externally cooled by means of an external cooling device, a multilayer tube being extruded with at least one wall layer of amorphous thermoplastic material on the inside of the wall layer consisting of crystalline thermoplastic material, the crystalline wall layer being made, for example, from polyethylene, and the amorphous wall layer being made, for example, from polyvinyl chloride.

A method for producing a biaxially oriented tube from thermoplastic material, in particular polyolefin plastics material, comprising the extrusion of a preform from thermoplastic material using an extruder which is provided with an extruder die having an inner core, the inner core defining an axial hollow space in the preform, and then forcing the preform over a mandrel, which mandrel comprises an expansion part which brings about expansion of the tube in the circumferential direction, the extruder die being provided with means for controlling the wall thickness of the preform coming out of the extruder die, and an ultrasonic device for measuring the wall thickness, which is arranged along the outside of the tube, being provided between the extruder die and the mandrel, for the purpose of measuring the wall thickness and shape of the cross section of the extruded preform, a layer of cold liquid being produced on the inside of the preform at the location of the wall-thickness measuring device, the temperature of the layer of cold liquid preferably being at most 50° C.

A method for producing a biaxially oriented tube from thermoplastic material, in particular polyolefin plastics material, comprising the extrusion of a preform from thermoplastic material using an extruder which is provided with an extruder die having an inner core, the inner core defining an axial hollow space in the preform, and then forcing the preform over a dimensionally stable mandrel in the axial direction, which mandrel comprises an expansion part which brings about expansion of the preform in the circumferential direction, the preform being forced over the mandrel by means of a speed-control means which engages on the preform upstream of the mandrel and by means of a drawing device which is arranged downstream of the mandrel, the preform being heated in a manner which can be controlled by circumferential sector upstream of the mandrel, this controllable heating per circumferential sector being effected by means of microwave radiation.

A method for producing a biaxially oriented tube from thermoplastic material, in particular polyolefin plastics material, comprising the extrusion of a preform from thermoplastic material using an extruder which is provided with an extruder die having an inner core, the inner core defining an axial hollow space in the preform, and then forcing the preform over a mandrel in the axial direction, which mandrel comprises an expansion part which brings about expansion of the preform in the circumferential direction, and a run-off part downstream of the expansion part, which run-off part is substantially constant in cross section, the preform being forced over the mandrel by means of a speed-control means which engages on the preform upstream of the mandrel and by means of a drawing device which is arranged downstream of the mandrel, and the run-off part having an axial length which is a multiple of the wall thickness of the oriented tube.

A method for producing a biaxially oriented tube having a wall layer made from polyolefin plastics material, comprising the extrusion of a preform from thermoplastic material using an extruder which is provided with an extruder die having an inner core, the inner core defining an axial hollow space in the preform, and then forcing the preform over a mandrel in the axial direction, which mandrel comprises an expansion part which brings about expansion of the preform in the circumferential direction, and a run-off part downstream of the expansion part, which run-off part is substantially constant in cross section, the preform being forced over the mandrel by means of a speed-control means which engages on the preform upstream of the mandrel and by means of a drawing device which is arranged downstream of the mandrel, a multilayer preform being extruded, which incorporates a plurality of wall layers with different properties, at least one of which is made from polyolefin plastics material, at least one of the wall layers being subjected, for example, to a crosslinking treatment, preferably an inner and/or outer wall layer, which preferably contains additives which promote crosslinking.

A method for producing a biaxially oriented tube from polyolefin plastics material, comprising the extrusion of a preform from thermoplastic material using an extruder which is provided with an extruder die having an inner core, the inner core defining an axial hollow space in the preform, and then forcing the preform over a mandrel in the axial direction, which mandrel comprises an expansion part which brings about expansion of the tube in the circumferential direction, and a run-off part downstream of the expansion part, which run-off part is substantially constant in cross section, the preform being forced over the mandrel by means of a speed-control means which engages on the preform upstream of the mandrel and by means of a drawing device which is arranged downstream of the mandrel, the tube being subjected to a crosslinking treatment downstream of the expansion part of the mandrel, preferably only a wall layer adjoining the inside and/or outside of the tube being subjected to a crosslinking treatment.

A connection of two tubes of biaxially oriented thermoplastic material, in particular polyolefin plastics material, in which the tubes, at their ends which face towards one another, are each provided with an integrally formed socket which preferably has a larger internal diameter than the adjoining part of the tube, and in which a connecting-tube body is provided, having two axial ends which each fit into a socket of a tube which is to be connected, and in which the socket of each tube is heat-shrunk onto that end of the connecting-tube body which fits into said socket securely.

The connection according to the previous paragraph, in which the connecting-tube body is provided, at each of its ends, with heater means for heating the socket which has been pushed over it, for example one or more electrical heater elements, for example heater wires, and/or one or more elements which can be heated from the outside, for example metal elements which can be heated via induction.

The connection according to one or more of the previous paragraphs, in which the heater means lie at a distance from the free end of the connecting-tube body.

The connection according to one or more of the preceding paragraphs, in which the outer surface of each end of the connecting-tube body is profiled in order to create a dimensionally stable connecting component between the connecting-tube body and the socket of the tube.

The connection according to one or more of the preceding paragraphs, in which the connecting-tube body consists substantially of plastics material.

The connection according to one or more of the preceding paragraphs, in which the internal diameter of the connecting-tube body is substantially equal to the internal diameter of that part of each tube which lies outside the socket.

A tube of biaxially oriented thermoplastic material, which plastics material has a stretch ratio, in the axial direction and in the circumferential direction, with respect to the preform from which the tube is made, the sum of the stretch ratio in the axial direction and in the circumferential direction being between 4 and 6, preferably between 4.5 and 5.5, particularly preferably being approximately 5.

A tube of biaxially oriented thermoplastic material, for example polyethylene (PE), which plastics material has a stretch ratio, in the axial direction and in the circumferential direction, with respect to the preform from which the tube is produced, the sum of the stretch ratio in the axial direction and in the circumferential direction being between 4 and 6, preferably between 4.5 and 5.5, particularly preferably being approximately 5, and the stretch ratio in the axial direction being in a relationship of 3:2 with respect to the stretch ratio in the circumferential direction.

The abovementioned measures and other measures provided according to the invention are described in the following description and will be explained below, in particular with reference to the drawings.

BRIEF DESCRIPTION OF THE DRAWINGS

FIGS. 1a and 1b diagrammatically depict a side view, partially in cross section, of an exemplary embodiment of an installation for producing biaxially oriented thermoplastic tubing.

DESCRIPTION OF PREFERRED EMBODIMENTS

Figure 2A:
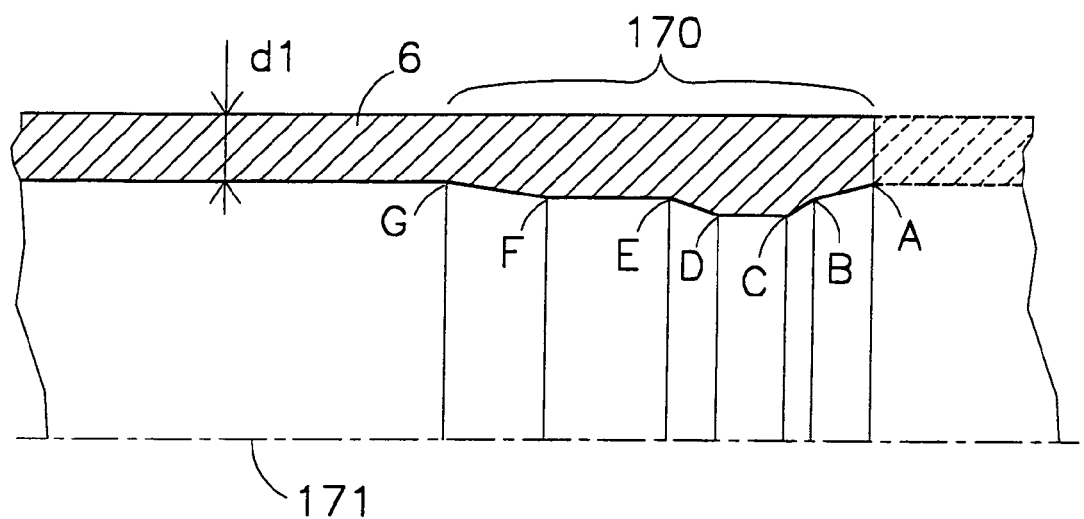
FIG. 2a shows a longitudinal section through part of the preform immediately after it has passed through the calibration device.

FIGS. 1a and 1b show, in two partial drawings which should adjoin one another, diagrammatic representations of the most important elements of an installation for producing biaxially oriented thermoplastic tubing in a continuous process.

FIG. 1a shows an extruder 1 with one or more extruder screws 2 and with an associated controllable drive, which creates a flow of molten plastics material which is fed to an extruder die 3 arranged on the extruder 1.

The extruder die 3 has an outer ring 4 and an inner core 5 which, together with the outer ring 4, delimits an annular outlet opening, from which an extruded tubular preform 6 made from thermoplastic material emerges in a substantially horizontal direction. In this arrangement, the inner core 5 defines an axial space in the preform 6.

The extruder die 3 is provided with means for controlling the wall thickness, which are not shown and can be used to produce a uniform wall thickness (in the circumferential direction) of the preform 6 coming out of the extruder die 3. An internal cooling member may be attached to the inner core 3 for internal cooling of the preform.

The preform 6 is externally calibrated with the aid of external calibration sleeve 10.

Downstream of the calibration sleeve 10 there is a first external cooling device 15, by means of which the preform 6 is externally cooled. The external cooling device 15 comprises, for example, a number of compartments which are located one behind the other, through which cooling water flows and through which the preform 6 moves, coming into direct contact with the cooling water. If appropriate, the cooling water in each compartment is at different temperatures, in order in this way to optimize the cooling of the preform 6.

Downstream of the external cooling device 15 there is a tube speed-control means 20 which acts on the cooled outer layer of the preform 6. The tube speed-control means 20 may in this case be designed as a drawing device which is known per se and has a plurality of tracks acting on the preform, which type of drawing device is customary for the extrusion of plastic tubes.

A heater device 25 is arranged downstream of the tube speed-control means 20. This device 25 comprises a plurality of heater units which are positioned around the path for the preform 6, can be controlled separately and are each directed towards a sector of the circumference of the preform 6. As a result, a separately controllable amount of heat can be fed to each sector of the preform 6, for example six circumferential sectors each of 60°.

The installation furthermore comprises an expansion mandrel 30, which in this case is non-deformable, also described here by the term dimensionally stable. The mandrel 30 is in this case made from metal. The mandrel 30 is held in a stationary position with respect to the extruder 1 and is in this case attached to the inner core 5 by means of a anchor member 31.

At its upstream end, the mandrel 30 has a run-on part 32, which in this case is of substantially cylindrical design. The said run-on part 32 is adjoined by an expansion part 33, the external surface of which substantially corresponds to the surface of a truncated cone with a diameter which increases in the downstream direction. The said expansion part 33 is adjoined by a run-off part 34 of the mandrel 30, which part 34 is of substantially constant diameter, if appropriate tapering slightly in the downstream direction. As a result of being forced over the mandrel 30, the preform 6 changes into a stretched tube 6'.

At the location of the mandrel 30, in particular of the run-off part 34, there is a second external cooling device 40, by means of which the stretched tube 6' is externally cooled. As is generally known for the production of biaxially oriented plastic tube, the stretched tube is cooled after it has passed the expansion part of the stretching mandrel, so that as a result the changes which have been brought about in the plastics material of the tube are frozen.

A second external calibration device 45 is arranged at a distance downstream of the mandrel 30, which calibration device 45 reduces the external diameter of the tube 6'.

The installation also comprises a drawing device 50 which is arranged downstream of the mandrel 30 and of the external calibration device 45. The drawing device 50 is intended to exert a considerable tensile force on the stretched tube 6'. Downstream of the drawing device 50 there is a cutting-to-length device (not shown), for example a sawing, cutting or milling device, in order to cut sections of the desired length from the tube 6' which has been produced.

The preform 6 coming out of the extruder die 3 has a relatively thick wall, in order thus to allow the biaxial stretching to take place. After the preform 6 leaves the extruder die 3, at a high temperature, the preform 6 is cooled/locally reheated by means of the first external cooling device 15 and by means of the heater device 25 in such a manner that the plastics material is at an orientation temperature which is suitable for biaxial orientation thereof before the preform 6 is forced over the expansion part 33 of the mandrel 30.

The preform 6 is forced over the mandrel 30 under the influence of the forces which are exerted on the preform 6 and the tube 6' by means of the drawing device 50 in conjunction with the tube speed-control means 20. By means of the drawing device 50 and the tube speed-control means 20, it is possible to accurately control the advancement speed both at a location upstream of the mandrel 30 (at tube speed-control means 20) and at a location downstream of the mandrel 30 (at drawing device 50).

As a result of passage over the mandrel 30, the molecules of the plastics material are oriented, i.e. stretched, both in the axial direction and in the circumferential direction, which is of great benefit to the properties of the tube 6'.

A unit for measuring the wall thickness may be arranged between the extruder 1 and the mandrel 30, by means of which unit the thickness of the preform 6 and the shape of the cross section of the preform 6 can be measured.

Downstream of the mandrel 30 there is a unit 60 for measuring wall thickness. This wall-thickness measuring unit 60 may be connected to a control unit which, on the basis of the measured cross section of the stretched tube 6', controls the operation of the drawing device 50, the device 25, and, if appropriate, the distance between the calibration device 45 and the mandrel 30.

The mandrel 30 may be provided with one or more feed ducts which open out in the outer surface of the mandrel 30 and, through the anchor member 31 and the extruder die 3, are connected to pump means (not shown) for supplying a liquid between the mandrel 30 and the preform 6. It is thus possible to form a film of liquid between the preform 6 and the mandrel 30, in particular between the preform 6 and the expansion part 33 of the mandrel 30. It is also possible to form a film of liquid between the run-off part 34 and the tube 6', serving to reduce the friction between the tube and the run-off part and, on the other hand, possibly also as internal cooling for the stretched tube.

In a variant, it is possible to introduce a gas, in particular heated air, under pressure between the non-deformable mandrel 30, in particular the expansion part thereof, and the preform 6, in order, in this way, to obtain a film of gas.

It is generally known from the prior art for the installation described above to be operated in such a manner that the preform 6 upstream of the mandrel 30 has, as accurately as possible, a uniform cross section, i.e. wall thickness and diameter, and also has a suitable orientation temperature which is as uniform as possible. Downstream of the mandrel 30, the stretched tube 6' then has a greater diameter and a smaller wall thickness.

In contrast to this known way of operating the installation, according to one aspect of the invention, it is possible, by periodically varying the ratio between the advancement speed of the preform 6, which is determined by the tube speed-control means 20, on the one hand, and the output of the extruder 1, on the other hand, between a first value and a second value, which is lower than the first value, for the extruded preform 6, in the section between the extruder 1 and the tube speed-control means 20, to alternately acquire a first wall thickness—if the said ratio is of the first value—and a second wall thickness—if the said ratio is of the second value—the second wall thickness being greater than the first wall thickness.

In the example presented here, this is effected by keeping the output of the extruder 1 substantially constant and by periodically varying the advancement speed of the preform 6 which is determined by the tube speed-control means 20. In this case, therefore, the ratio between the advancement speed of the preform 6, which is determined by the tube speed-control means 20, on the one hand, and the output of the extruder 1, on the other hand, is kept substantially constant at the first value for a first period, so that a long piece of preform 6 with a first wall thickness "d1" is produced. During a second period, which is considerably shorter than the first period, the speed of the tube speed-control means 20 is set to a lower value, with the result that a preform part having the second, greater wall thickness "d2" is then formed immediately downstream of the extruder die 3, as indicated in FIG. 1*a* by reference numeral 70.

The method provides for continuous production in which a thickened preform part 70 is preferably obtained at regular intervals.

During the external calibration 10, the preform 6 acquires a uniform external diameter, so that the thickened preform part 70 projects inwards in that area with respect to the preform part having the first wall thickness, as indicated by a dashed line.

The thickened preform part 70 then passes through the external cooling device 15 and arrives at the mandrel 30, where the thickened preform part 70 is made to bulge outwards by the run-on part 32 of the mandrel (indicated by a dashed line).

When it passes over the mandrel 30, the preform 6, and consequently also the thickened preform part 70, is stretched axially and in the circumferential direction, as will be described in more detail below.

When it passes through the external calibration device 45, the thickened part 70 is pressed inwards again (as indicated by a dashed line), resulting in a stretched tube 6' having thickened parts 70 at (regular) axial intervals and, between these thickened parts, in each case a long part of smaller wall thickness d1.

In one practical embodiment, the tube 6' is cut to length downstream of the drawing device 50 at each thickened part 70, and the distance between two thickened parts 70 corresponds to the desired length of the tube sections to be produced by cutting the tube 6' to length. As a result, each tube section then has a tube body and, at one end, a thickened tube part with a greater wall thickness than the tube body. Preferably, the thickened end part of the tube is then subjected to a socket-forming operation, so that a high-quality integral socket can be obtained.

In another variant, the tube 6' is cut to length in such a way that there is a thickened end part at each end of a tube section. It is then possible for one of the ends to be deformed into a socket, while the other end, possibly without further treatment, can be used as a thickened spigot.

In a preferred embodiment of the method according to the first aspect of the invention, the biaxially stretched tube undergoes substantially the same axial stretching over its entire length. Since the advancement speed of the preform 6 upstream of the mandrel 30, which is determined by the tube speed-control means 20, varies, it is therefore necessary for the advancement speed of the tube 6' downstream of the mandrel 30 which is determined by the drawing device 50 to be varied periodically, in such a manner that the ratio between the advancement speed of the tube 6' downstream of the mandrel 30 and of the preform 6 upstream of the mandrel 30 is kept substantially constant during the production of both a thickened part and an unthickened part.

In a variant of the method according to the first aspect of the invention, there is provision for a thickened part 70 not to undergo the same axial stretching as the intervening parts of the first wall thickness d1, but rather for the thickened part 70 to undergo greater axial stretching. For this purpose, in the period during which a thickened part 70 is being forced over the mandrel 30 or during part of this period, the ratio between the advancement speed downstream of the mandrel 30 which is determined by the drawing device 50 and the advancement speed upstream of the mandrel 30 which is determined by the tube speed-control means 20 is greater than in the period during which a part of the preform which has the first wall thickness d1 is being forced over the mandrel 30.

To enable the process to be controlled successfully, it is desirable for the axial stretching of the preform to take place within an accurately defined subsection of the installation. For this purpose, it is possible for the stretched tube 6' to be cooled downstream of the expansion part 33 of the mandrel 30, in such a manner that the cooled tube 6' does not undergo any further axial stretching and the generation of the axial stretching is concentrated in the section between tube speed-control means 20 and the downstream end of the mandrel 30.

To control the process, it is furthermore advantageous for the temperature of the preform 6, upstream of the mandrel 30, to be conditioned with the aid of the cooling device 15 and, if appropriate, to a slight extent by the heater device 25 in such a manner that a thickened preform part 70 is on average at a higher temperature, measured at a location immediately upstream of the mandrel 30, than an immediately adjoining downstream preform part of the first wall thickness d1 which is already on the mandrel 30.

As has already been described, the speed of the preform 6 is reduced while the preform part 70 with a thickened wall is being formed. As a result of the reduction in speed, that part of the preform which during this period is located in the cooling device 15 will be subjected to the cooling action for a longer time than that part of the preform which has already passed through the cooling 15. When the preform part 70 with a thickened wall has been formed, the speed of the preform 6 is increased again and the preform part 70 will pass through the cooling 15 at this higher speed and thus, in relative terms, will be cooled to a lesser extent than the immediately downstream part of the preform 6. When the thickened part 70 then reaches the mandrel 30, the said part 70 is hot and easy to deform, while that part of the preform which is located immediately downstream thereof and has a thinner wall is in fact relatively rigid. Through a combination of the two effects, it is possible to successfully force the thickened part 70 onto and over the mandrel 30 without the part downstream thereof being stretched excessively in the axial direction.

Tests have demonstrated that, in the case of PVC, the wall thickness of the said thickened preform parts may be 15% greater than that of the intermediate parts without causing any problems.

Preferably, the variation in the wall thickness of the preform 6 is always gradual, so that there are no abrupt transitions from one wall thickness to the other wall thickness.

Incidentally, it is conceivable for the thickened preformed parts not to be produced specifically for the subsequent formation of a socket, but rather, for example, to enable a branch pipe to be connected to the stretched tube. The thickened tube part could also be used as a point for a drawing device arranged, for example, downstream of the expansion mandrel to engage on the tube, so that a high tensile force can be exerted on the tube in order to force the preform over the expansion mandrel.

The shape of the thickened part 70 shown in FIGS. 1a and 1b is, of course, only shown by way of example. In fact, it has proven possible for the wall thickness of the thickened part 70 to be controlled accurately and, in this way, for a specific profile to be imparted accurately to the wall of the thickened part 70 as seen in the longitudinal direction of the tube.

FIG. 2a shows a longitudinal section through half of the preform 6 at a location immediately after it has passed through the calibration device 10, having a thickened tube part 170 produced by varying the speed of tube speed-control means 20 with respect to the output of the extruder 1.

In FIG. 2a, d1 denotes the first wall thickness which is used for a long part of the preform 6. The line 171 is the centre axis of the preform 6. The thickened part 170 has a profile with a plurality of wall thickness values, described by points A, B, C, D, E, F and G.

Figure 2B:
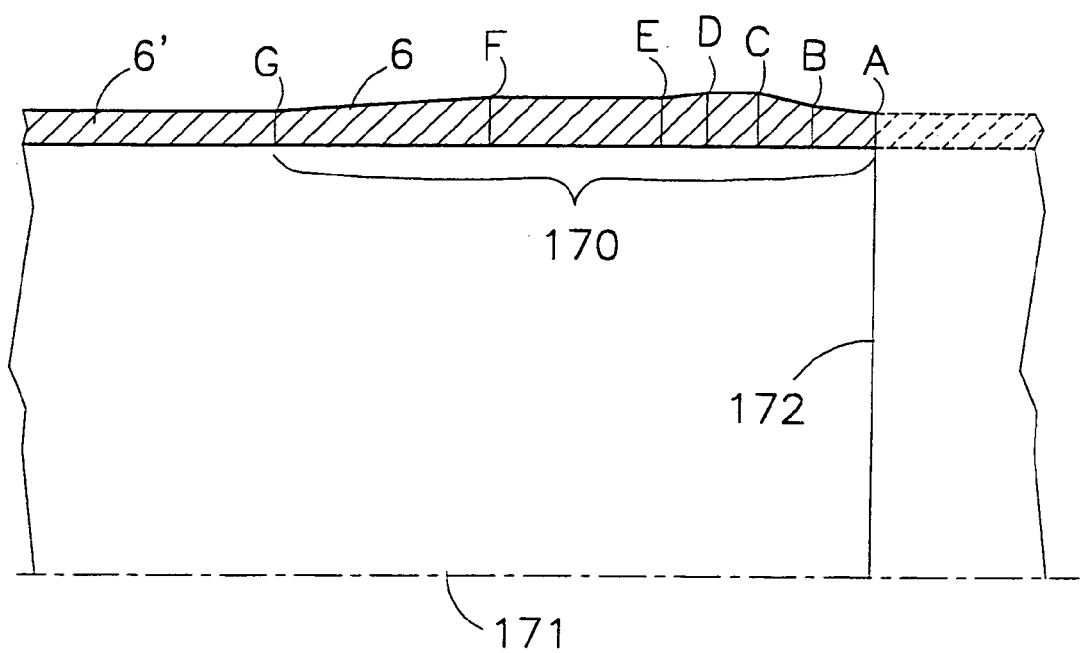
FIG. 2b shows the part from FIG. 2a after it has passed over the expansion mandrel.

FIG. 2b shows the same thickened part as in FIG. 2, but in this case after it has passed over the mandrel 30. This can be seen clearly from the greater diameter and reduced wall thickness of the now stretched tube 6'. It is clear that the internal diameter of the tube 6' is now uniform and the wall thickness profile can be seen on the outside. The points A–G show that stretching has taken place in the axial direction and in the circumferential direction of the thickened part 170 when it passed over the mandrel 30.

Figure 2C:
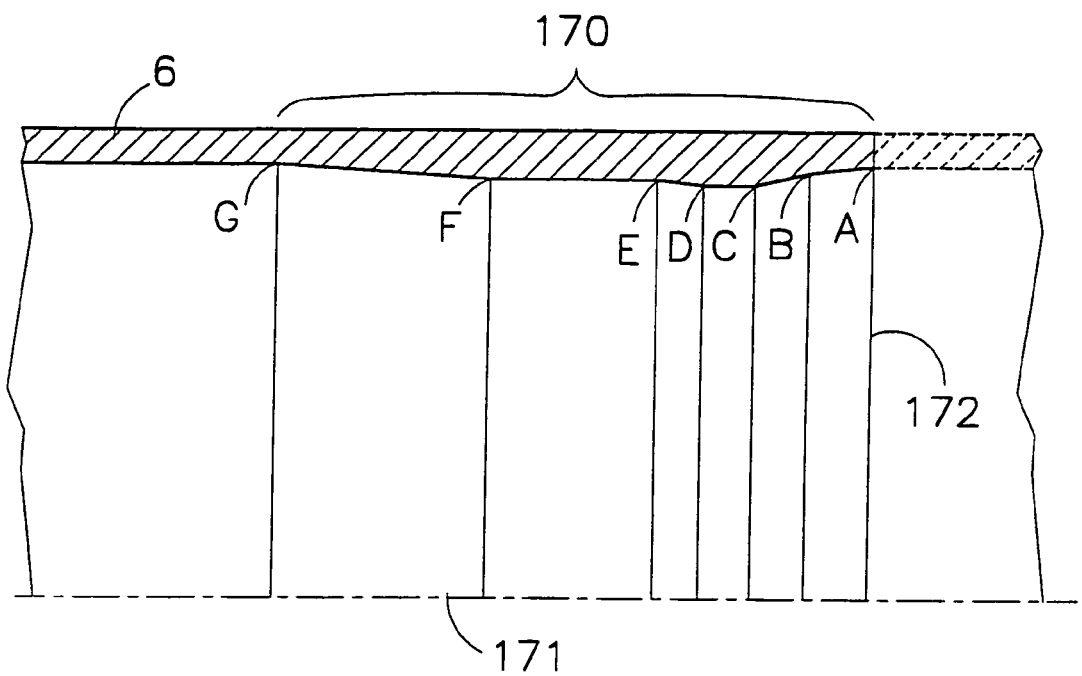
FIG. 2c shows the part from FIG. 2b after it has passed through the calibration device downstream of the expansion mandrel.

FIG. 2c shows the part of tube 6' after it has passed through the calibration device 45, which device, incidentally, is optional in the method according to the first aspect of the invention. The external diameter is now uniform once again, while the profile can be seen on the inside.

As described, there is provision for the tube 6' to be cut to length at the thickened part 170, in this case at line 172. Then, the cut-to-length tube section is subjected to a socket-forming operation, during which the thickened part 170 of the said tube section is deformed to form a socket.

Figure 2D:
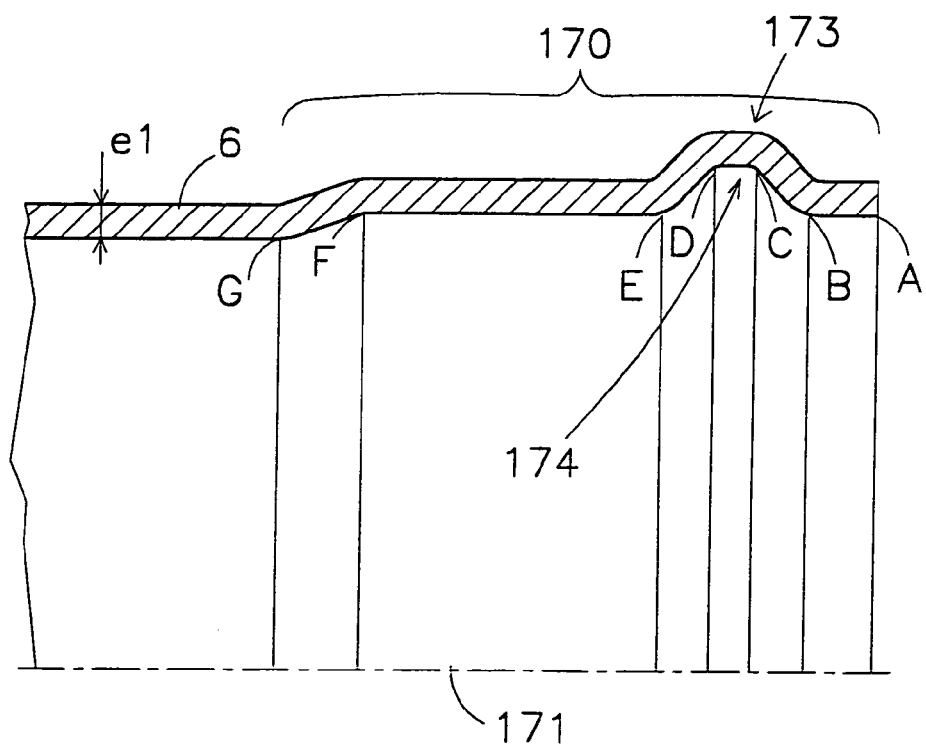
FIG. 2d shows the part from FIG. 2c after it has been deformed into a socket.

FIG. 2d shows a possible embodiment of that end of a tube section which is provided with a socket and has been produced as described with reference to FIGS. 2a, 2b and, if appropriate, 2c.

At one end, the prefabricated tube section with a thickened tube part 170 has a greater wall thickness than the tube body, and the axial stretching of the thickened end part prior to the socket-forming operation is equal to or preferably greater than the axial stretching of the tube body. It will be clear from the preceding text how a tube section of this nature can be produced.

In particular, FIG. 2c shows that the end part of the prefabricated tube, as seen from its end face, has a plurality of annular areas which adjoin one another and have a wall thickness which fluctuates from one annular area to the next annular area, the wall thickness, in the case of a plurality of annular areas, being greater than the wall thickness of the tube body.

Then, during the socket-forming operation, in this case the annular area between points B and E is deformed into an outwardly bulging groove wall 173 which delimits an internal groove 174 of the tube, which is intended to accommodate a sealing ring (not shown).

The groove wall 173 may advantageously have a greater level of axial stretching than the tube body with wall thickness e1, in particular if the thickened tube part 170 is produced in such a manner that it already exhibited a greater level of axial stretching prior to the formation of the socket than the adjoining tube body, more or less beyond point G. The additional wall thickness of the annular area from which the groove wall 173 is formed makes it possible to ensure that, even as a result of the increase in diameter of the said part during the formation of the socket, the final wall thickness of that part is no less than that of the tube body. In particular, this is possible without the axial stretching of the said part of the tube being reduced or even converted altogether into negative stretching through compression of the said part, as is known from the prior art.

It will be clear that the advantages discussed with reference to the groove wall 173 also apply to the other areas of the socket which are formed from the thickened tube part 170. Ultimately, therefore, it is possible to produce a tube section from biaxially oriented plastic material which has a tube body and an integral socket, the axial stretching of the socket being equal to or preferably greater than that of the tube body. In this case, the wall thickness of the socket may also be equal to or even greater than that of the tube body.

Figure 3A:
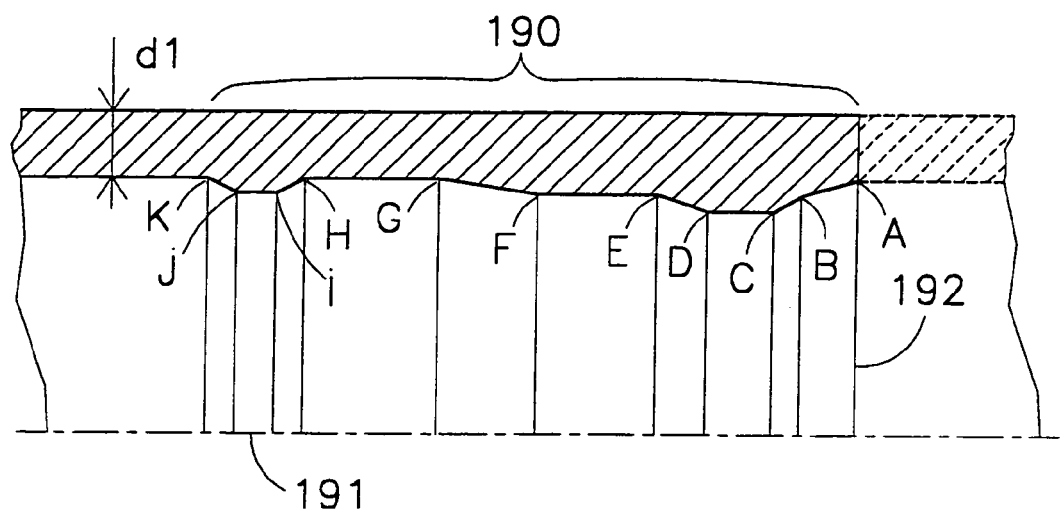
FIG. 3a shows an illustration corresponding to FIG. 2a of another embodiment of the preform.

In an illustration corresponding to FIG. 2a, FIG. 3a shows another embodiment of a thickened part 190 which has been produced using the method according to the invention. This thickened part 190 has a first zone, indicated by points A–G, which virtually corresponds to the description given with reference to FIG. 2a. The line 191 is the centre axis. Further away from the end of the tube section to be produced, shown by line 192, the thickened part 190 has a second zone, between points G and H, with a wall thickness d1 corresponding to the thickness of the preform outside the thickened part 190. This is followed by a third zone, indicated by points H-K, with a greater wall thickness.

Figure 3B:
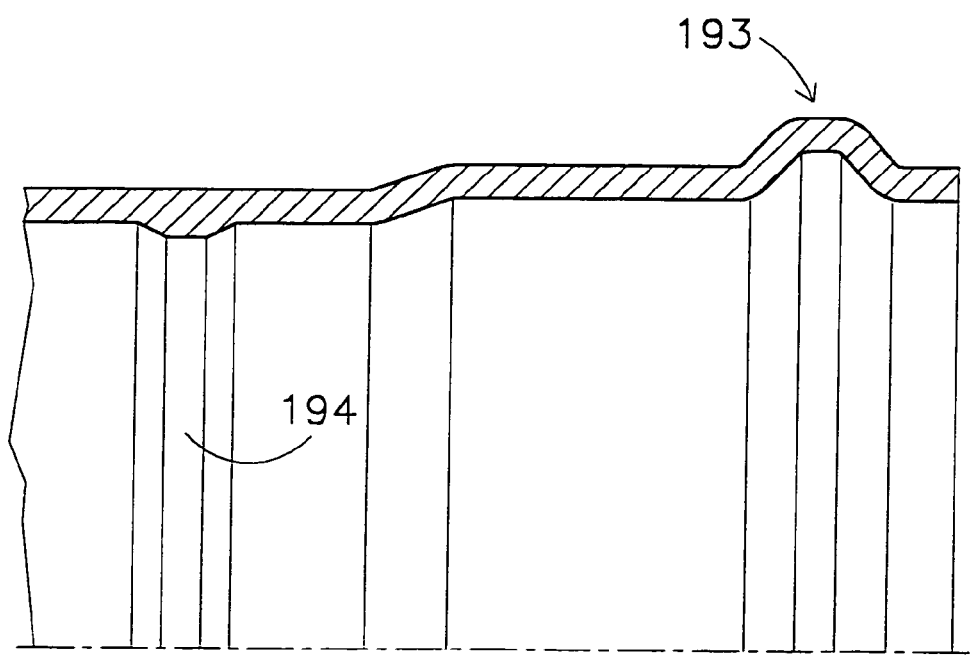
FIG. 3b shows an illustration corresponding to FIG. 2d of the part from FIG. 3a which has been deformed into a socket.

It can be seen in FIG. 3b that only the first zone of the thickened part 190 has been deformed into a socket. This first zone is deformed in the same way as that described with reference to FIG. 2d and has a groove wall 193. The third zone forms an inwardly projecting rim 194. This rim 194 serves to receive a support bush which is introduced into the first zone when the socket is being formed, in order to provide internal support for this zone during heating. When the socket is being formed, this support bush is then pushed further into the tube and then comes to bear against the rim 194. This prevents the support from penetrating too far into the tube and also prevents this support bush from locally overheating the tube.

During the formation of a socket at the end part of a biaxially oriented tube, in particular at the thickened end part as explained above, it is deemed advantageous if, during the formation of the socket using a socket-forming mandrel, the said end part does not undergo any compressive strain, i.e. axial compression. This is because compressive strain leads to a reduction in the axial stretching in the end part which is deformed into a socket, and this may be disadvantageous. For example, it can be seen in WO 97/33739 that, during the formation of the socket, pressure is exerted on the end side of the tube, so that the compressive strain is generated.

To control such compressive strain during formation of the socket, so that the compressive strain can be kept at a low level or even avoided altogether, it is possible for the tube to be provided, in the vicinity of its end side, with a holding zone which lies between the said end and that part of the tube which is to be deformed into a socket. Before the socket-forming mandrel is introduced into the tube, the tube is then gripped and held in the said holding zone, while the socket-forming mandrel is pressed into the end part of the tube as far as into that part which is to be deformed into a socket, which part lies beyond the holding zone, as seen in the insertion direction of the mandrel. As a result of the holding zone being held, undesirable and uncontrollable compressive strain on the end part of the pipe is avoided. If appropriate, lubrication may also be provided between the mandrel and the end part of the tube, in order to reduce the friction between them.

Preferably, after the socket has been formed, the holding zone is removed from the tube, for example by means of a cutting or sawing device. Since this holding zone is subsequently removed, it is also permissible for this zone to be damaged when it is gripped. By way of example, a socket-forming installation provided with a socket-forming mandrel and with actuable holding means is used for gripping and holding the holding zone of the tube. By way of example, the holding means comprise teeth which lodge fixedly in the plastic in this zone.

In an advantageous embodiment, the holding zone is designed as a thickened annular area of the tube. If appropriate, the holding means form a type of collar which engages behind the said thickened annular area.

Figure 4:
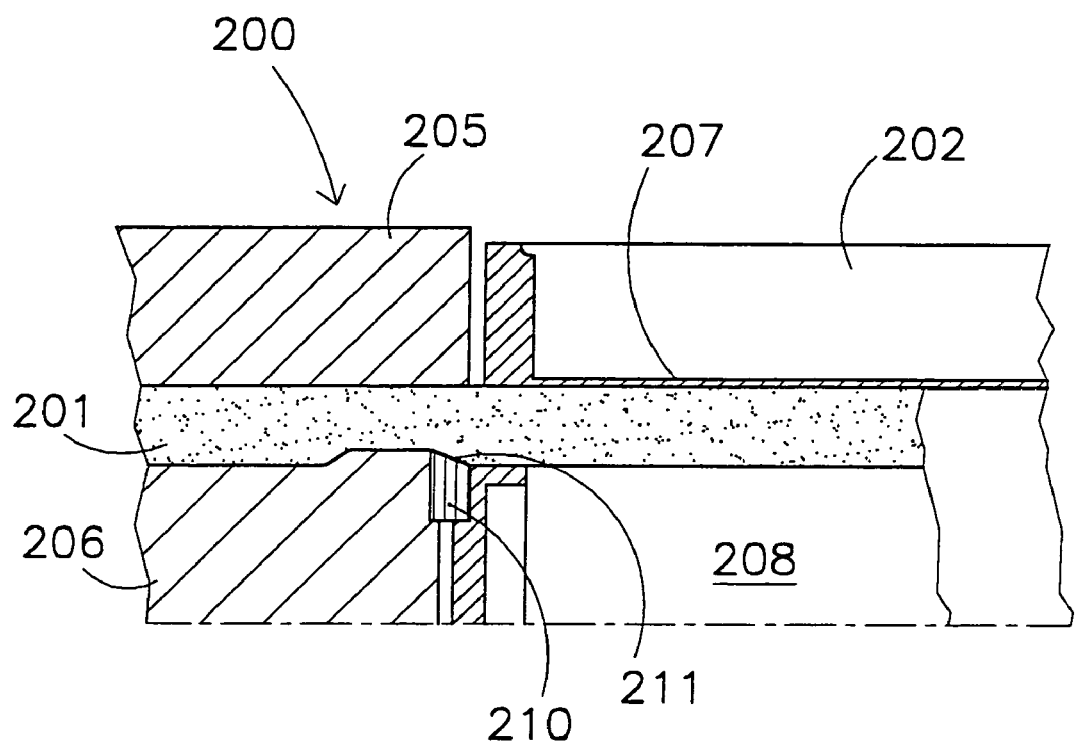
FIG. 4 shows a cross section through part of an extruder die according to the invention, FIGS. 5a and 5b diagrammatically depict a side view, partially in cross section, of an exemplary embodiment of an installation for producing biaxially oriented thermoplastic tubing.

FIG. 4 shows a cross section through part of extruder die 200 which is suitable for use in the method described above and is used to extrude a preform 201 from thermoplastic material. Furthermore, the figure shows a section of an external calibration device 202 arranged downstream of the extruder die 200.

The extruder die 200 comprises an outer ring 205 and an inner core 206, which between them delimit an annular gap for the plastics material which is supplied by an extruder (not shown).

The calibration device 202 is positioned closely behind, virtually against, the extruder die 200, in order to prevent the preform 201 from being exposed to the outside air for an undesirably long time, which is advantageous from both a chemical and a thermal point of view.

The calibration device 202 has a sleeve 207 which defines the external diameter of the preform 201. The calibration device 202 cools the outside of the preform, and a solidified skin forms on the outside of the preform 201.

Immediately downstream of the extruder die 200, the preform 201 is also cooled internally by means of an internal cooling member 208, only part of which is shown.

As described above, there is provision for the wall thickness of the preform 201 to be changed periodically in order, in this way, to obtain a preform part with a greater wall thickness, as shown in FIG. 4. To obtain a preform part with a greater wall thickness than that defined by the gap between the inner core 206 and the outer ring 205, flowable plastic material has to be able to flow from the extruder die 200 to the thicker preform part. For this reason, it is undesirable for a solidified skin to form on the inside of the preform, immediately downstream of the inner core. To counteract this skin formation, an insulating member 210 which is attached to the inner core 206 is provided.

The insulating member 210 has a conical outer surface 211 which adjoins the outer surface of the inner core 206 and has an external diameter which decreases in the direction of extrusion. During the formation of a thickened part in the preform 201, the plastic material then bears against the said insulating member 210 and the formation of a solid skin is prevented at that location. Preferably, the outer surface 211 of the insulating member 210 lies at least partially inside the outer ring 205. As a result, the swelling of the preform 201 to obtain a thickened part in the preform 201 can take place even upstream of the external calibration device 202 arranged closely behind the extruder die 200.

Figure 5A:
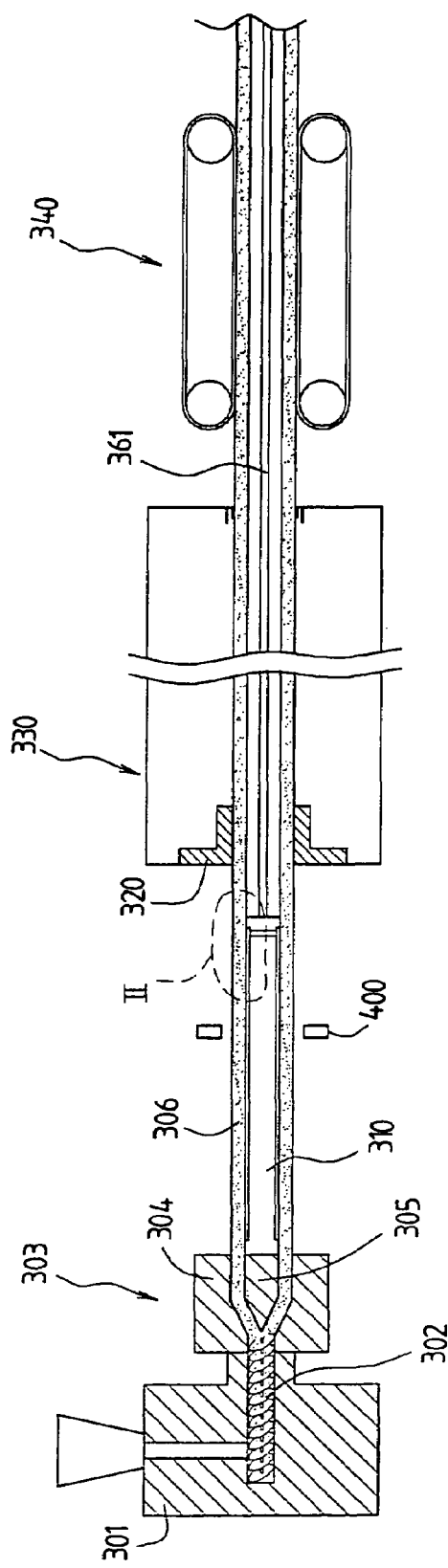
Figure 5B:
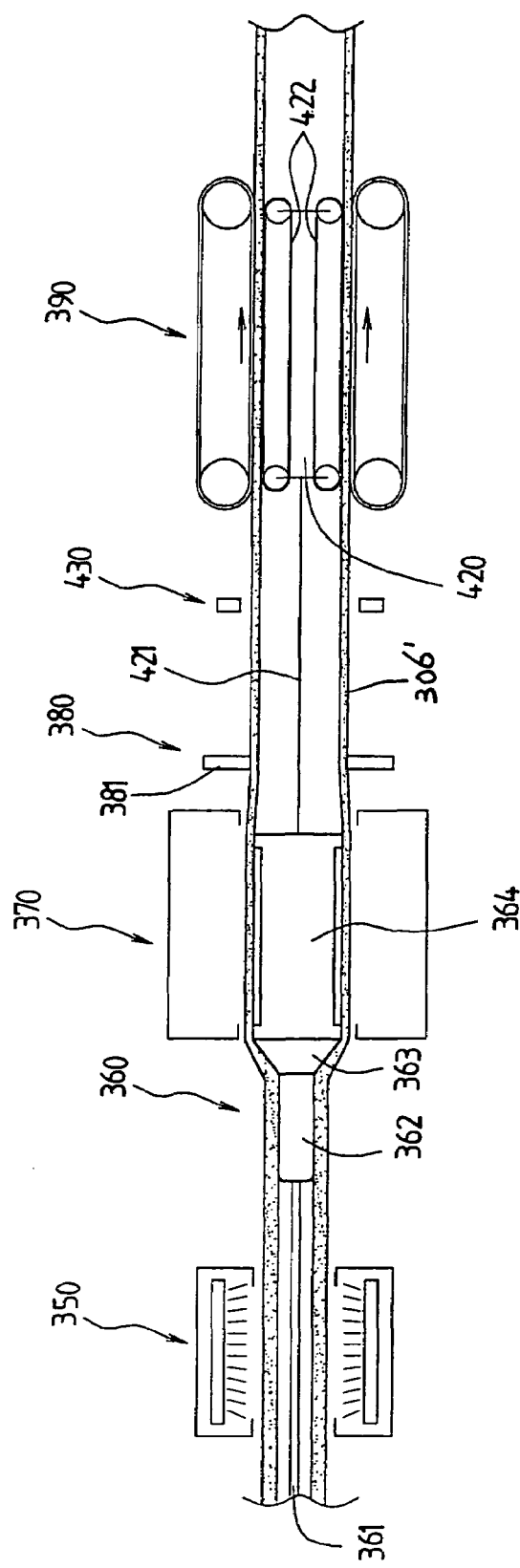

In two partial drawings which are to adjoin one another, FIGS. 5a and 5b diagrammatically depict the most important elements of an installation for producing biaxially oriented thermoplastic tubing in a continuous process.

The wall thickness of the tube to be produced is preferably such that the tube is dimensionally stable. In particular, it is intended to produce tube which is suitable for the assembly of pipework systems for transporting liquid or gas, in particular for drinking water, sewage water, natural gas or the like. Preferably, the tube is suitable for laying in the ground.

FIG. 5a shows an extruder 301 having one or more extruder screws 302 with an associated controllable drive, by means of which a flow of molten plastic material is provided, which is fed to an extruder die 303 arranged on the extruder 301.

The extruder die 303 has an outer ring 304 and an inner core 305 which, together with the outer ring 304, delimits an annular outlet from which an extruded preform 306 of thermoplastic material emerges in a substantially horizontal direction. In this arrangement, the inner core 305 defines an axial space in the preform 306.

The extruder die 303 is provided with means for controlling the wall thickness (not shown) by means of which a uniform wall thickness (in the circumferential direction) of the preform 306 coming out of the extruder die 303 can be produced.

Figure 6:
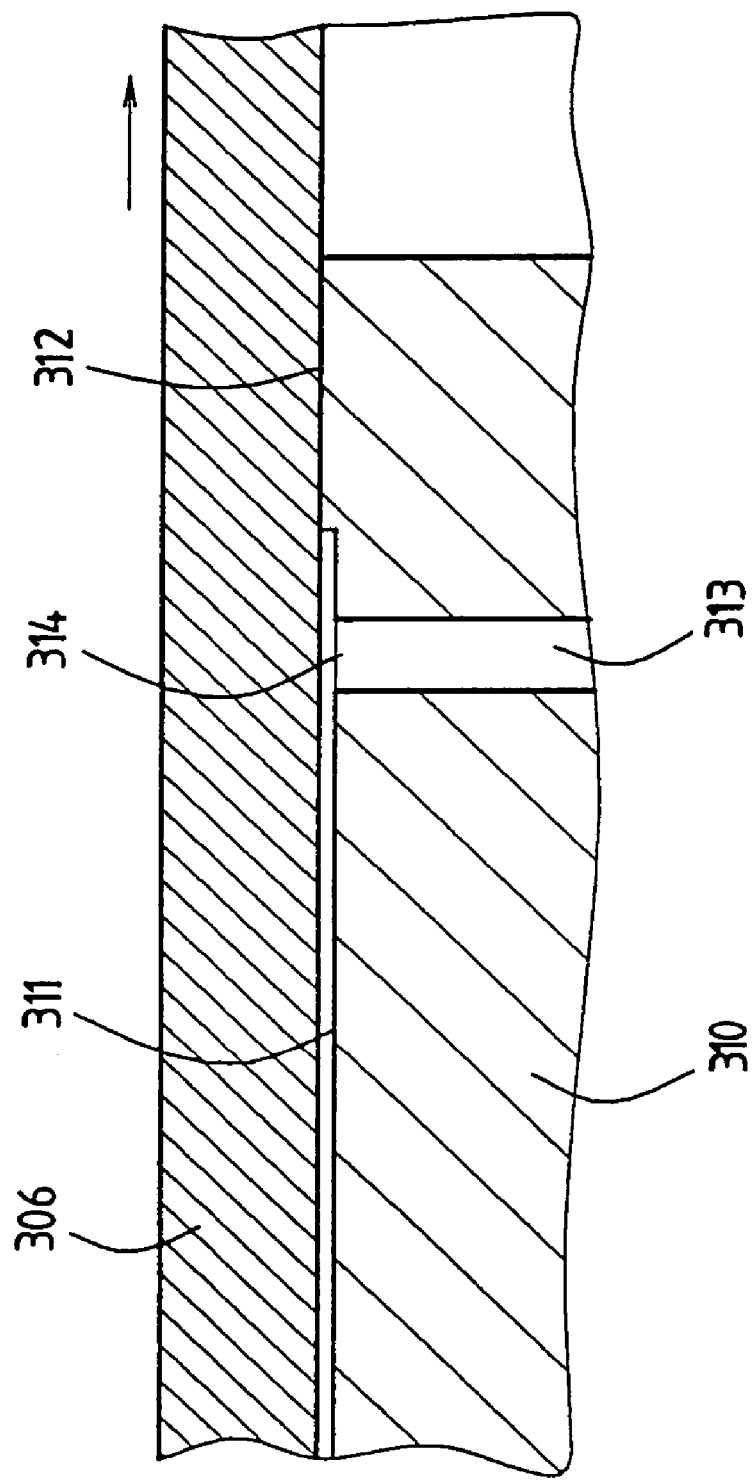
FIG. 6 shows the detail II in FIG. 5a on an enlarged scale.

An internal cooling member 310, the construction of which will be explained below with reference to FIG. 6, is attached to the inner core 303. The internal cooling member 310 is designed in such a manner that the preform 306 coming out of the extruder die 303 is internally cooled immediately downstream of the extruder die 303.

The preform 306 is externally calibrated with the aid of calibration sleeve 320. This calibration sleeve 320 brings about a slight reduction in the external diameter of the preform 306. The calibration sleeve 320 is arranged downstream of the internal cooling member 310, at a location where the preform 306 is not internally supported by a solid component. This arrangement has the advantage that the preform 306 then cannot become jammed at the said calibration sleeve 320, since a reduction in the internal diameter of the preform 306 can take place without problems.

Downstream of the calibration sleeve 320 there is a first external cooling device 330, by means of which the preform 306 is cooled externally. The external cooling device 330 comprises, for example, a number of compartments which are positioned one behind the other, through which cooling water flows and through which the preform 306 moves, coming into direct contact with the cooling water. If appropriate, the cooling water may be at different temperatures in each compartment, in order to optimize the cooling of the preform 306.

Since the external cooling device 330 is arranged downstream of the internal cooling member 310, as seen in the direction of extrusion, the preform 306 coming out of the extruder die 303 is initially only cooled internally (apart from very slight natural cooling of the outside of the preform from the ambient air), and is thereafter only cooled externally. This ensures that the preform 306 is not simultaneously subjected to the cooling action of the internal cooling member 310 and the external cooling device 330. Depending on the axial distance between the internal cooling member 310 and the external cooling device 330, there may be a small overlap between the cooling action of the internal and external cooling.

The fact that the internal cooling member 310 and the external cooling device 330 are arranged offset from one another in the axial direction proves advantageous in particular for a thermoplastic material which crystallizes on cooling after extrusion and consequently exhibits significant volume shrinkage. This type of material includes, inter alia, polyethylene (PE), which undergoes volumetric shrinkage which may amount to some 30%.

As a result of the cooling action of the internal cooling member 310, a cold wall layer is formed on the inside of the preform 306 immediately downstream of the extruder die 303, which cold wall layer is relatively dimensionally stable. If a cold layer were to be formed on the outside at the same time by means of external cooling, a still hot intermediate layer of plastic material would be enclosed between two cold, rigid wall layers. Cooling of this intermediate layer can then easily result in shrinkage cavities in the intermediate layer, and there is also a considerable risk of visible deformations being formed, in the form of pits or indentations, in the outside and inside of the tube 306' produced. If cooling initially takes place only on the inside, shrinkage of this intermediate layer can be absorbed by material being supplied from the uncooled outer layer of the preform. Once the inner layer has been cooled, cooling from the outside can then begin.

Downstream of the external cooling device 330 there is a speed-control means 340 which acts on the cooled outer layer of the preform 306. The speed-control means 340 is in this case designed as a drawing device which is known per se and has a plurality of tracks acting on the tube, which type of drawing device is customarily used for the extrusion of plastic tubes.

A heater device 350 is arranged downstream of the speed-control means 340. This device 350 comprises a plurality of heater units which are positioned around the path for the preform 306, can be controlled separately and are each directed towards one sector of the circumference of the preform 306. As a result, a separately controllable amount of heat can be supplied to each sector of the preform 306, for example six circumferential sectors each of 60°.

The installation furthermore comprises an expansion mandrel 360 which is in this case is of non-deformable design, also described here by the term dimensionally stable. The mandrel 360 is in this case made from metal. The mandrel 360 is held in a stationary position with respect to the extruder 301, and is here attached to thew extruder 301, in particular to its inner core 305, by means of a anchor member 361 on the internal cooling member 310 and via the said internal cooling member 310.

At its upstream end, the mandrel 360 has a run-on part 362, which in this case is of substantially cylindrical design. The said run-on part 362 is adjoined by an expansion part 363, which has an external surface which substantially corresponds to the surface of a truncated cone with a diameter which increases in the downstream direction. The said expansion part 363 is adjoined by a run-off part 364 of the mandrel 360, which part 364 is of substantially constant diameter, if appropriate tapering slightly in the downstream direction.

At the mandrel 360, in particular in the area of the run-off part 364, there is a second external cooling device 370, by means of which the stretched tube 306' is cooled externally. As is generally known for the production of biaxially oriented plastic tube, the stretched tube is cooled after it has passed the expansion part of the stretching mandrel, so that as a result the changes which have been brought about in the plastics material of the tube are frozen.

At a distance downstream of the mandrel 360 there is a second external calibration device 380, which calibration device 380 brings about a reduction in the external diameter of the stretched tube 306'.

The installation also comprises a drawing device 390 which is arranged downstream of the mandrel 360 and of the external calibration device 380. The drawing device 390 is intended to exert a considerable tensile force on the tube 306'. A cutting-to-length device, for example a sawing, cutting or milling device, may be located downstream of the said drawing device 390, for the purpose of cutting sections of the tube produced to a desired length. Alternatively, a coiling device could also be provided for the purpose of winding the tube 306' produced onto a reel.

The preform 306 coming out of the extruder die 303 is thick-walled. After the preform 306 leaves the extruder die 303 and is then at a high temperature, cooling/local reheating of the preform 306 is brought about by means of the internal cooling member 310, the first external cooling device 330, and by means of the heater device 350, in such a manner that the plastics material is at an orientation temperature which is suitable for biaxial orientation thereof before it moves over the expansion part 363 of the mandrel 360.

The preform 306 is passed over the mandrel 360 under the influence of the forces which are exerted on the preform 306 by means of the drawing device 390 in conjunction with the speed-control means 340. The speed of the preform/tube 306 can be controlled by means of the drawing device 390 and control means 340 both at a location upstream of the mandrel 360 (at speed-control means 340) and at a location downstream of the mandrel 360 (at drawing device 390).

As a result of the passage over the mandrel 360, the molecules of the plastics material are oriented both in the axial direction and in the circumferential direction of the tube 306', which is highly advantageous for the properties of the tube 306'.

Details of the installation shown in FIGS. 5*a* and 5*b* will be explained in more detail below, partly with reference to the further figures.

The Internal Cooling Member

Part of the internal cooling member 310 can be seen in FIG. 6. The internal cooling member 310 has a rigid, dimensionally stable cylindrical outer wall, for example made from metal, with a long central section 311, the diameter of which is slightly smaller than the diameter of end sections 312 lying at the upstream and downstream ends of the said middle section 311 (only the downstream end section can be seen in FIG. 6). The difference in diameter between the section 311 and the sections 312 is preferably no more than 3 millimeters and is at least 0.5 millimeter. This difference is exaggerated in FIG. 5*a*.

The axial length of the end sections 312 is considerably shorter than that of the central section 311, the length of the central section 311 preferably being a multiple of the wall thickness of the preform 306. In practice, it is preferable for this length to be one meter or more.

The internal cooling member 310 is provided with a feed passage 313, which opens out at one or more openings 314 lying in the surface of the central section 311, which openings 314 are located in the vicinity of the downstream end section 312. Furthermore, the internal cooling member 310 also comprises, at the upstream end of the central section 311, one or more openings (not shown) which adjoin an outlet passage of the internal cooling member 310.

The installation furthermore comprises feed means (not shown) for cooling liquid, which are connected to the inlet passage 313 and by means of which cooling liquid can be introduced between the central section 311 of the internal cooling member 310 and the preform 306. This cooling liquid then forms a film of liquid and flows, preferably at high speed, in the opposite direction to the direction of extrusion, towards the openings of the outlet passage. In this way, internal cooling of the preform 306 is brought about.

The high speed of the cooling liquid in the film of liquid has the advantage, firstly, that despite the small volume of the film of liquid it is still possible to obtain an effective cooling action. In this context, it is important for the liquid in the film of liquid not to evaporate, since this would result in an undesirable build-up of pressure in the preform 306. Another important advantage of the high speed relates to the problem of forming air or gas bubbles in the cooling liquid. As is known, the cooling liquid used is generally water, and this cooling water contains air. Therefore, when the cooling water is heated, air bubbles are formed, and these air bubbles generally rise upwards. If internal cooling is used in which cooling liquid, referred to below as water, comes into direct contact with the inside of the plastic preform to be cooled, the said air or gas bubbles represent a very considerable drawback. Owing to the presence of an air or gas bubble, the inside of the preform is cooled to a lesser extent at that location than in the surrounding area and consequently becomes less dimensionally stable than the cooler surrounding area. As a result of the volumetric shrinkage of the plastics material during cooling, as described above, the shrinking material will pull the already rigid surrounding layer of skin of the preform inwards. As a result, a pit is formed in the inside of the preform at the location at the air bubble, in which pit the air bubble is enclosed. As a result, the air bubble remains in place at that location and the cooling of this small area remains poor, so that the pit becomes even deeper. This leads to a clearly detectable pit in the inner surface of the stretched tube, which is unacceptable. Incidentially, bubbles may also be formed by gases which are released from the extruded preform.

Generally, any local disruption in the internal cooling has been found to leave a visible mark on the inside of the tube 306', and for this reason it is important for the internal cooling to be highly regular.

When using liquid internal cooling, it is already known for the bubbles to be sucked out by means of a suction tube which connects to the highest point of an internal cooling compartment which is present in the extruded tube and through which cooling liquid flows. However, this solution is not always possible and/or satisfactory, in particular since the adverse effect of the air bubbles occurs very quickly after the preform has come into contact with the air bubbles and because once air bubbles have formed, they tend to continue to adhere to the preform despite the suction.

For these reasons, it is important, when using internal cooling, for the preform to be provided with a cool, dimensionally stable layer on the inside by cooling as soon as it leaves the extruder die, as is the case with the internal cooling member 310 described above. This is particularly important for the internal cooling of profiles which have been extruded from plastics material such as polyethylene (PE) and polypropylene (PP). It has been found that in the case of polyvinyl chloride (PVC), for example, this problem is less significant. It is also important for this cool layer to be maintained throughout the entire path during which internal cooling takes place, since otherwise the abovementioned pitting could still occur. Furthermore, it will be clear that it is important to counteract the formation of air bubbles, in particular large air bubbles or an accumulation of air bubbles.

In the case of the internal cooling member 310, the high flow velocity of the cooling liquid ensures that only small air bubbles are formed, which are entrained by the quick-flowing liquid and do not adhere to the inside of the preform.

The formation of air bubbles during internal cooling can also be reduced by firstly deaerating the cooling liquid, such as water, used for the internal cooling before the liquid is introduced into the preform which is to be cooled. The deaerating may, for example, be carried out by firstly boiling the water and then allowing it to cool; if appropriate, the boiling may take place at subatmospheric pressure.

Another solution for counteracting the drawbacks of air or gas bubbles during internal cooling is the use of a cooling liquid with a low surface tension. This may, for example, be achieved by using water as the cooling liquid, in which case one or more substances which reduce the surface tension are added to the water. This may, for example, involve the addition of alcohol to the cooling water. Due to the low surface tension, it is easy for air bubbles to be formed, but the air bubbles are extremely small, leading to less pitting.

Another solution for avoiding the adverse effect of air or gas bubbles is the generation of a helically oriented flow of the cooling liquid along the inside of the preform which is to be cooled. This flow prevents air bubbles from building up along the top side of the internal circumference of the tube. If appropriate, in the case of the internal cooling member 310, a shallow helical profile could be provided in the surface 311 in order to generate this flow.

Yet another measure for avoiding the adverse effect of air or gas bubbles is to improve the wetting of the internal surface of the extruded preform, so that the liquid adheres more successfully to the said surface and the bubbles are released more easily.

In combination with the internal cooling member 310 attached to the inner core 305, it is also conceivable for the inner core 305 to be provided with cooling in order, in this way, for the internal cooling of the extruded preform 306 to be initiated even earlier.

It will be clear that the solutions for internal cooling described here are suitable not only for use in the production of biaxially oriented tube, but also for any other process for extruding tube sections from thermoplastic material. However, another factor in the production of biaxially oriented tube from crystalline thermoplastic material, such as polyethylene (PE), is that the crystallization and the associated significant volume shrinkage takes place in a temperature range which lies in the vicinity of the orientation temperature, i.e. the stretching temperature, which is the temperature the preform has to be at when it passes over the mandrel.

The first external calibration sleeve 320 is in particular located at a distance downstream of the internal cooling member 310, in view of the above-described design of the internal cooling member 310, in which case there is only a thin film of liquid between the preform 306 and the internal cooling member 310. The rigid design of the internal cooling member 310 means that the preform 306 would be unable to contract there without becoming jammed on the internal cooling member 310.

Effects of the Crystalline Composition

The biaxial stretching process, in which a tube is extruded and this tube is forced in-line over a stretching mandrel, has already been used with success for amorphous thermoplastic materials, in particular for tubes made from polyvinyl chloride. Many tubes, for example for drinking water and gas pipes, however, are made from crystalline thermoplastic materials, in particular from polyethylene and polypropylene. The difference between a composition of the plastics material described as amorphous or as crystalline has proven to have significant effects on the progress and execution of the said biaxial stretching process. It should be noted that crystalline materials, such as PE and PP, are in fact two-phase systems, in which part of the material is amorphous and part is crystalline. The ratio between the amorphous part, on the one hand, and the crystalline part, on the other hand, depends in particular on the cooling of the molten plastics material and therefore in particular on the cooling rate.

In the case of the biaxial stretching process, for example using the installation shown in FIGS. 5a and 5b, firstly a thick-walled preform is extruded, which then has to be cooled to a suitable orientation temperature which is significantly lower than the temperature of the preform when it leaves the extruder die 303. For this reason, the internal cooling member 310 and the first external cooling device 330 are active.

In view of the poor thermal conductivity of thermoplastic materials, in this continuous process, in which, obviously, the highest possible production rate is desired, it is inevitable that the cooling of the plastics material will not take place uniformly throughout the cross section of the preform. In particular, the inner and outer sides of the preform, which come into contact with a cooling medium, will undergo rapid cooling and consequently a large number of crystals, but primarily very small crystals, will be formed in those areas. Inside the preform, the cooling will proceed more slowly. As a result, a large number of crystals, but very small crystals, are formed on the inner and outer sides of the preform, while larger crystals are formed inside the preform.

This difference may constitute a drawback for the biaxial stretching of the preform and the end result achieved. To solve or reduce this problem, it is conceivable to allow the highly cooled layer of the preform to be heated downstream of the internal cooling of the thick-walled preform coming out of the extruder, so that the small crystals begin to grow. This can be achieved by allowing this layer to be heated by heat transfer from the centre of the wall and/or by bringing the inner side of the preform into contact with a heating medium. In particular, it is possible to provide a compartment downstream of the internal cooling member in the hollow space in the preform, which compartment is filled with hot liquid, for example at a temperature of between 90–100° C.

The above-described problem that, when using internal cooling for an extruded tube or preform made from a crystalline thermoplastic, large numbers of small crystals are formed on the intensively cooled inner side, can also be resolved by designing the tube or preform with a multilayer wall. In this case, the inner wall layer, which is cooled most quickly by the internal cooling, is preferably made from an amorphous thermoplastic, while the layer around it is extruded from a crystalline thermoplastic. By way of example, the inner layer is made from polyvinyl chloride, and the outer layer is made from polyethylene. Incidentally, the same idea can also be applied to the situation with external cooling, in which case it is advantageous for a wall layer made from a crystalline thermoplastic to be surrounded by an outer layer of an amorphous thermoplastic. Combining the above aspects results in a profile with an inner wall layer made from amorphous material and an outer wall layer made from amorphous material with, between them, a wall layer made from a crystalline thermoplastic, for example a three-layer profile with two (thin) shells made from PVC, which enclose a thicker intermediate layer of PE. A profile of this nature can be subjected to a biaxial stretching process, for example by forcing the profile which comes out of the extruder over a downstream expansion mandrel.

The crystal formation may also be influenced by adding a substance which serves as a nucleus for the formation of crystals to the plastics material. The addition of chalk has proven to have a beneficial effect on crystal formation in the production of biaxially oriented tubes from polyethylene. In particular, a large number of crystals are formed rapidly. It should also be noted that an inner wall layer made from PVC solves or counteracts the above-described problem of pitting caused by air bubbles in the cooling water of the internal cooling. This is because PVC has a better thermal conductivity than PE, and the wetting by cooling liquid, in particular water, is also better.

It should be noted that extrusion devices for extruding multilayer tubes are generally known.

Wall Thickness Control

During the biaxial stretching of a preform over a mandrel, any deviations in the wall thickness of the preform which is still to pass over the mandrel have proven to have a considerable influence on the behaviour of the preform as it passes over the mandrel and thus on the biaxial orientation achieved. It is already known for a unit for measuring the wall thickness to be arranged between the extruder and the mandrel, which unit can be used to measure the thickness of the wall and the shape of the cross section of the preform. Wall-thickness measuring units of this nature are often ultrasonic units in which an ultrasonic pulse is transmitted through the wall from the outside and the reflection of this pulse determines the wall thickness. This is because the reflection is based on the difference between the sound transmission velocity through the wall and through the medium located in the preform.

As described above, the preform is still relatively hot in the section between the extruder and the expansion mandrel, and this causes problems with the operation of such ultrasonic wall-thickness measuring units. Furthermore, in the case of crystalline thermoplastics, the crystallization takes place precisely at the temperatures prevailing in that section, resulting in a considerable change in the density of the thermoplastic, which in turn has consequences for the transmission of the ultrasonic pulse. This effect is also disadvantageous for the operation and reliability of the measurements using the ultrasonic wall-thickness measuring unit. It has been found that the operation improves if a layer of cold liquid lies along the inside of the preform at the location of the ultrasonic wall-thickness measurement, or if the preform is filled with a cold liquid at this location. If the liquid were to be hot, for example water in the vicinity of 100° C., the ultrasonic wall-thickness measurement appears to function considerably less accurately than with a cold liquid. It is assumed that this is because, in particular, the difference in transmission velocity between the preform and the liquid is important for the reflection of the ultrasonic pulse, and in the case of hot liquid this difference is smaller. In known ultrasonic wall-thickness measuring units, one or more ultrasonic transmitter/receivers rotate around the tube. In this embodiment, it is conceivable for a feed for a flow of cold liquid to rotate inside the tube at the same location.

In FIG. 5a, 400 diagrammatically depicts an ultrasonic wall-thickness measuring unit, the above-described layer of cold liquid being produced using the internal cooling member 310 which has been described in detail above.

Another consequence of the wall-thickness measurement at a location between the extruder 301 and the mandrel 360 is that the temperature of the preform 306 also has an influence on the ultrasonic wall-thickness measurement. As described, in this section the said temperature may vary, for example because the action of the internal and external cooling is adjusted in the start-up phase. In order to reduce the influence of the preform wall temperature on the measured wall thickness, it is possible to arrange a device for measuring the temperature of the tube wall in the vicinity of the ultrasonic wall-thickness measuring unit 400 and to provide a suitable compensation algorithm, which is used to compensate for the influence of the temperature in the measured wall thickness.

Formation of Differences in Wall Thickness and Orientation

In the biaxial stretching process, one of the most important aspects is the passage of the preform over the stretching mandrel, whereby the preform is stretched in the radial direction and possibly also in the axial direction. From the prior art, it is known to seek to treat the extruder tube in the section between the extruder and the mandrel in such a manner that the said tube arrives at the mandrel with a wall thickness which is as uniform as possible and preferably also at a temperature which is as uniform as possible within the temperature range which is suitable for biaxial orientation.

It is also known that, despite these preparatory operations, deviations in the cross section of the preform may still arise as a result of passage over the mandrel. These deviations relate to the wall thickness of the preform as seen in the circumferential direction and, if appropriate, eccentricity of the inner side with respect to the outer side. These deviations are then observed using a second wall-thickness measuring unit 130 arranged downstream of the mandrel. To make it possible to correct these deviations, it is already known to utilize the heater device 350 shown in FIG. 5b. As mentioned above, this heater device 350 comprises a plurality of heater units which are arranged in the vicinity of the mandrel 360 and around the preform 306. Each of the said heater units can be used to emit a separately adjustable amount of heat to an associated sector of the circumference of the preform 306 which is moving past. As a result of the added heat, the temperature, and consequently the rigidity, of the plastics material changes. In this way, it is possible to adjust the resistance which the preform 306 undergoes when it passes the mandrel 360 in sectors in the circumferential direction of the preform. This adjustment is known per se.

In practice, even when using this heater device 350, it has emerged that undesirable deviations in the cross-sectional form and wall thickness of the tube forced over the mandrel 360 still arise. This problem, as well as an associated solution, will be explained in more detail with reference to FIGS. 7 and 8.

Figure 7:
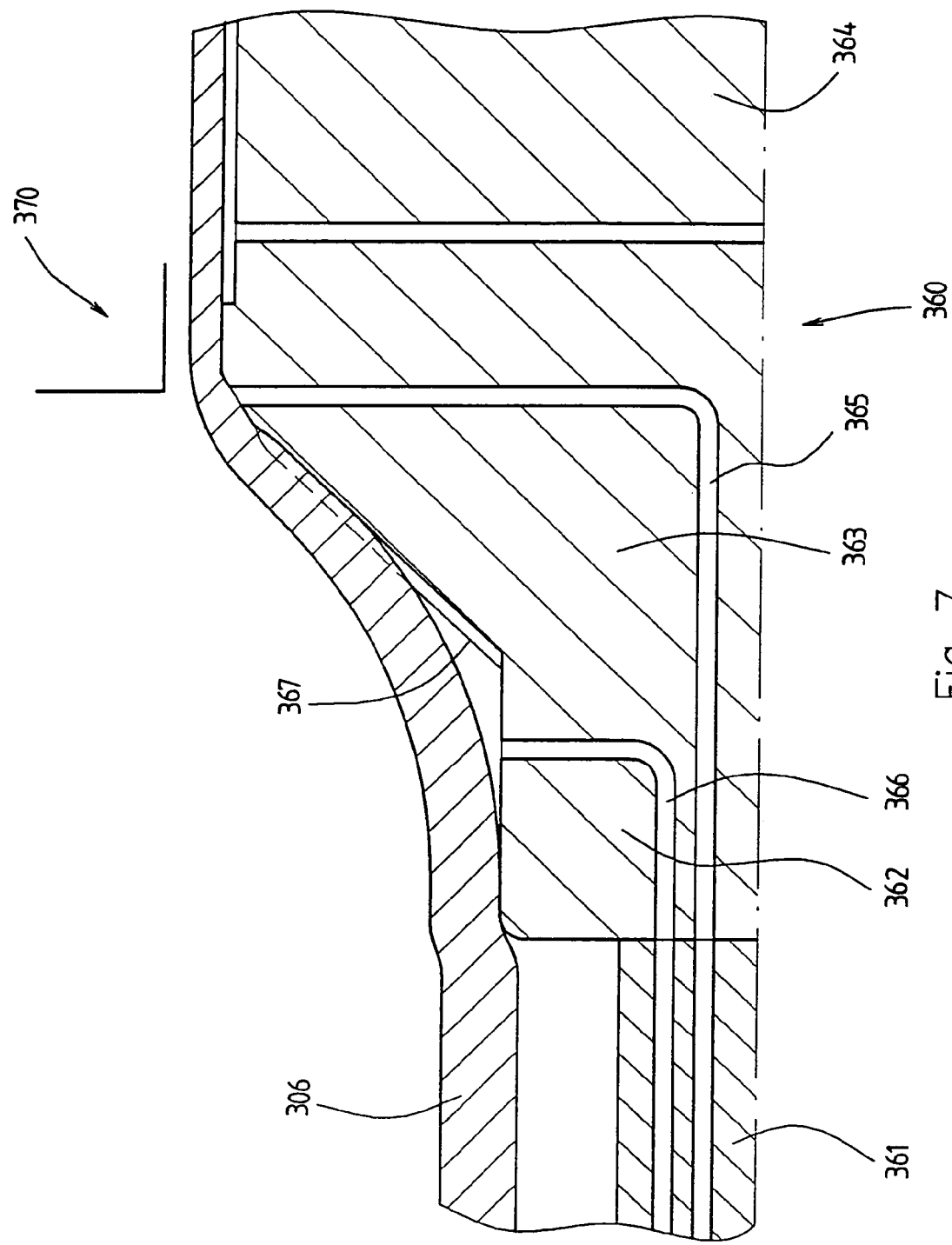
FIG. 7 shows a part of the mandrel from FIG. 5b on an enlarged scale.
Figure 8:
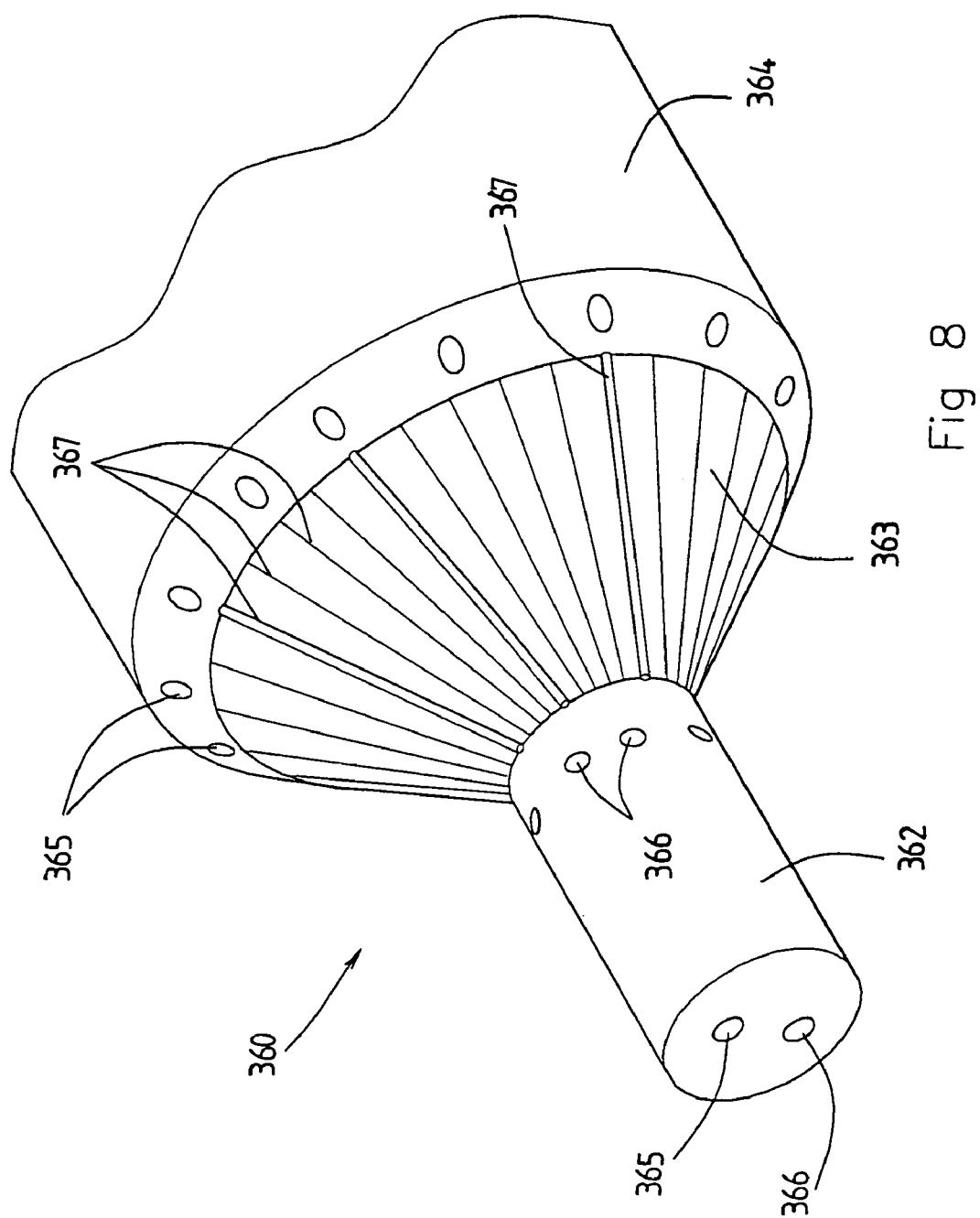
FIG. 8 shows a perspective view of the mandrel from FIG. 3.

FIGS. 7 and 8 show the mandrel 360 with run-on part 362, expansion part 363 and run-off part 364. The expansion part 363 of the mandrel 360 has an outer surface which substantially corresponds to the surface of a truncated cone.

The mandrel 360 is provided with one or more feed passages 365 which, in the vicinity of the downstream end of the expansion part 363, open out in an outer surface of the mandrel 360 and, through the anchor member 361 and the extruder die 303, are connected to pump means (not shown) for supplying a liquid between the mandrel 360 and the preform 306. Furthermore, the mandrel 360 is provided with one or more outlet passages 366 which extend from an opening arranged in the run-on part 362, through the anchor member 361 and the extruder die 303, to an outlet. By means of these passages 365 and 366 and the associated pump means, it is possible to produce a flowing film of liquid between the preform 306 and the mandrel 360, in particular between the preform/tube 306 and the expansion part 363 of the mandrel 360. This formation of a film of liquid, for example a film of water, between the preform 306 and the mandrel 360 is known per se. In this case, the liquid in the film flows in the opposite direction to the direction of movement of the preform 306 over the expansion part 363. Due to the presence of the film of liquid, there is in fact little or no frictional contact between the preform 306 and the expansion part 363. The film of liquid not only reduces the friction but also cools the surface of the mandrel 360 to below the melting point of thermoplastic. Above this temperature, the coefficient of friction rises very rapidly.

In practice, in such a known situation with a dimensionally stable mandrel and a film of water between the mandrel and the preform, it has been found that, when the preform passes over the expansion part, local differences in wall thickness which were not present, or were present to only a very slight extent, upstream of the mandrel form in the circumference of the preform. In other words, it is generally observed that one zone of the circumference of the preform moving over the mandrel becomes much thinner, while in adjoining areas there is little or no reduction in the wall thickness. This not only leads to unacceptable deviations in the wall thickness of the tube produced, but also to a difference in the biaxial orientation.

It has been found that the abovementioned problem can be solved/reduced by providing the outer surface of the expansion part 363 of the mandrel 360 with axially extending elongate grooves and/or ribs at a plurality of locations around the circumference of the expansion part 363.

It can be seen in FIG. 8 that a large number of shallow grooves 367 is formed in the outer surface of the expansion part 363. In this figure, for the sake of clarity a number of these grooves 367 are shown on an exaggerated scale. FIG.

7 also shows one such groove 367. The grooves 367 extend in the axial direction, i.e. in the direction in which the preform 306 is forced over the mandrel 360. The grooves 367 are preferably distributed over the expansion part at regular angular intervals, preferably of between 3° and 10°.

When the preform 306 is forced over the mandrel, some of the soft plastics material of the preform 306 will move into these grooves 367, as shown in FIG. 7. This form of engagement between the preform and the expansion part of the mandrel limits the freedom of movement of the plastics material of the preform in the circumferential direction of the expansion part of the mandrel, which has proven to considerably reduce the abovementioned problem of local deviation of the wall thickness in the tube which is ultimately obtained.

Shallow grooves 367 are sufficient to achieve the above effect. In practice, 5 millimeters have proven to be the upper limit, while depths of between 0.5 and 3 millimeters are preferred; grooves with a depth of 0.5 millimeter and a width of 0.5 millimeter have even proven effective.

Some of the film of water between the preform and the mandrel will pass through the grooves 367, but a film of liquid will be maintained between the mandrel and the preform in the areas which lie between the grooves 367. Incidentally, it is also conceivable for the liquid to be supplied not via passage 365, but rather via a passage which opens out further downstream, in the run-off part 364, in the outer surface of the mandrel.

In practice, the grooves 367 lead to small longitudinal ribs on the inner circumference of the preform passing over the expansion part of the mandrel. However, these ribs are reduced in size considerably by the smooth run-off part of the mandrel. In practice, only a visible impression of the said ribs remains, which is acceptable. Obviously, if the grooves 367 were replaced by raised ribs, a pattern of shallow longitudinal grooves would form in the tube. This also does not present any problems.

It can be seen from FIG. 7, as well as from FIG. 5b, that a second film of liquid is formed in a manner known per se between the run-off part 364 of the mandrel 360 and the tube 306'. This second film of liquid is used, on the one hand, to reduce the friction between the tube and the run-off part and, on the other hand, may also serve as internal cooling for the stretched tube.

In a variant which is not shown, the heater device 350, which in a known design comprises infrared radiators, is provided with means for heating the preform using microwave radiation. In this way, not only the surface of the preform, but also, in particular, the interior of the preform wall could be heated.

Generating the Tensile Force Required

The desired improvement in the properties of the plastics material in the biaxial stretching process is achieved in particular if the extruded tube is stretched to a considerable extent in the axial but also in the radial direction. Thus, in practice the diameter of the tube will often increase by a factor of two or more when the tube passes over the mandrel.

However, at the orientation temperature which is suitable for the biaxial stretching process, the plastics material is already reasonably rigid and thus not easily deformable. Consequently, very considerable forces have to be exerted on the tube in order to allow the tube, which is thick-walled upstream of the mandrel, to pass over the mandrel. The presence of one or more films of liquid between the tube and the mandrel thus leads to a reduction in the tensile force, but the forces required for the stretching process still remain a problem.

A first problem relates to the transmission of the tensile force to the tube 306' by means of the drawing device 390 positioned downstream of the mandrel 360. In generally known drawing benches, there are a plurality of driven tracks, for example 2, 3 or 4 such tracks, and the transmission of the tensile force from the drawing device to the tube is based on friction between tube and tracks. The friction is determined by the coefficient of friction and the normal force. In this case, the coefficient of friction is determined by the materials coming into contact with one another and is not easy to increase significantly. The normal force is limited by the load-bearing capacity of the tube in order thus to prevent damage. Therefore, the tensile force which can be exerted by means of a drawing device is limited.

One measure which allows the tensile force which can be exerted to be increased is the use of a plurality of drawing devices arranged one behind the other, so that the friction between the tube and the drawing devices is distributed over a larger surface area. In this case, the drawing devices have to move the tube forwards at the same speed, in order to prevent the tracks of one of the drawing devices slipping on the tube. Since the stretched tube at that location has already cooled to significantly below the orientation temperature, further axial stretching is also undesirable.

Another measure is to support the tube internally at the location of the drawing device 390, so that the drawing device is able to exert a greater normal force on the tube than in the absence of this internal support.

The internal support could, for example, consist of producing an internal pressure in the tube, for example by using two closure means to form a closed compartment in the tube at the level of the drawing device and by introducing pressurized gas or liquid into this compartment.

The internal support could also be of mechanical design. FIG. 5b diagrammatically depicts one example, in which an internal support device 420 is attached to the mandrel 360, via a anchor member 421, at the level of the drawing device 390. The support device 420 in this case has pressure belts 422 which run with the tube 306' and bear against the inside of the tube 306' opposite the belts of the drawing device 390. As a result, the drawing device 390 can press firmly against the outside of the tube 306' without any risk of the tube 306' being damaged.

In the case of greater tube diameters, the internal support device itself could also be provided with a drive for advancing the tube 306', in which case this device is then supported on the mandrel via a member which can be subjected to compressive loads. This support then leads to a reduction in the tensile force in the connection between the extruder and the mandrel.

Another possibility for exerting the required tensile force on the tube during the biaxial stretching process is to base the transmission of the tensile force to the tube on a form-fitting connection between the drawing device and the tube instead of on friction as described above. This can be achieved by allowing the tube to actually be deformed, possibly permanently damaged, at locations which lie at an axial distance from one another, through the engagement of the downstream drawing device on the tube. The distance between the points of engagement is then preferably slightly greater than the length of the tube sections to be produced. By way of example, the drawing device engages on the tube by means of projections which project into or through the tube wall.

Maintaining Properties of the Tube Produced

A significant problem with polyolefin tubes is that the improved properties obtained through the biaxial stretching process are completely or largely lost even at a low temperature of the tube (40° C. for PE). This means that a tube of this nature cannot be stored in the sun without the abovementioned loss occurring, unless special measures are taken to enhance the stability of the tube produced.

It is preferable to strive for stability-enhancing operations on the tube which can be carried out in line with the production of the tube, instead of downstream or in a separate process in which tube sections are treated. To this end, it is proposed that the crosslinking operation be carried out in line downstream of the expansion part of the stretching mandrel.

It can be seen in FIG. 5b that the run-off part 364 of the mandrel 360 is of a considerable length, which in this case is a multiple of the wall thickness of the tube. In practice, lengths of more than 1 meter may be advantageous, which is possible in particular if a film of water is formed between the run-off part and the tube. The great length of the run-off part 364 makes the tube 306' more stable, since the stretched tube 306' then has a form which is defined by the run-off part 364 for a relatively long period, during which period the effects brought about by the expansion can become stable.

Another way of enhancing the stability of the tube is to crosslink the plastics material of the tube. This may take place in various ways which are known per se. It is also possible for only one, or more, layers of the tube wall to be subjected to a crosslinking treatment, for example only the layer on the outside of the tube.

The stability can also be enhanced by producing multilayer tubes, as has already been described above, in which case the form of one of these layers is in fact so stable that less stable layers, for example an uncrosslinked PE layer, are prevented from changing shape. This may, for example, be achieved by combining such a PE layer with a PVC layer. It is also conceivable for specific layers of the said multilayer tube to be subjected to the crosslinking process, so that as a result one of the layers blocks a change in shape of the other layer or layers.

Another variant is for the tube produced firstly to be cut to length, resulting in tube sections, and for these tube sections then to be treated in a separate (batch) process, in order to achieve the desired stabilization. In particular, it is conceivable for a tube section to be pushed onto a dimensionally stable internal support and then subjected to a heat treatment for a specific period, for example a number of hours. During this treatment, the internal support prevents a change in shape of the biaxially oriented tube section, which shape is therefore maintained, and a considerable part of the stretching of the plastics material will be maintained. After this treatment, the tube section will be considerably less susceptible to loss of the properties obtained by stretching.

By subjecting the tube to one or more of the treatments described above, it is possible to obtain a tube from biaxially oriented plastics material which makes it possible, via a weld joint, to form a connection to a tube part or other component which is to be joined thereto. Weld joints of this nature are used primarily for polyolefin tube, such as PE tube. If a tube is now made from biaxially oriented polyethylene or the like, a pipe branch saddle for making a connection for a branch pipe can, for example, be securely welded thereto without the shape of the pipe changing undesirably as a result of the heat supplied.

Connection of Biaxially Oriented Pipes

It is already known to provide tube parts made from biaxially oriented thermoplastic material, in particular PVC, with a socket at one end, in order to make it possible to assemble a pipe from tube parts which have been fitted together. In this arrangement, it is known for a socket of this nature to be provided with an elastic sealing ring which bears in a sealed manner against the end of the other pipe which has been fitted into it.

In the case of tubes made from biaxially oriented polyolefin, a socket joint of this nature causes problems with regard to the seal, in particular in the long term. These problems arise in particular from the fact that many polyolefins exhibit a significant amount of creep, i.e. the material begins to yield under load over the course of time. In the case of a socket joint as described above, this creep phenomenon will cause the contact pressure between the sealing ring and the inserted tube end to decrease gradually, since the wall of the tube will begin to yield over the course of time. This results in the possibility of leakage, particularly under pressure.

To connect two tubes of biaxially oriented thermoplastic material, in particular polyolefin plastics material, to one another, an improved connection is therefore proposed, which will be explained in more detail below with reference to FIG. 9.

Figure 9:
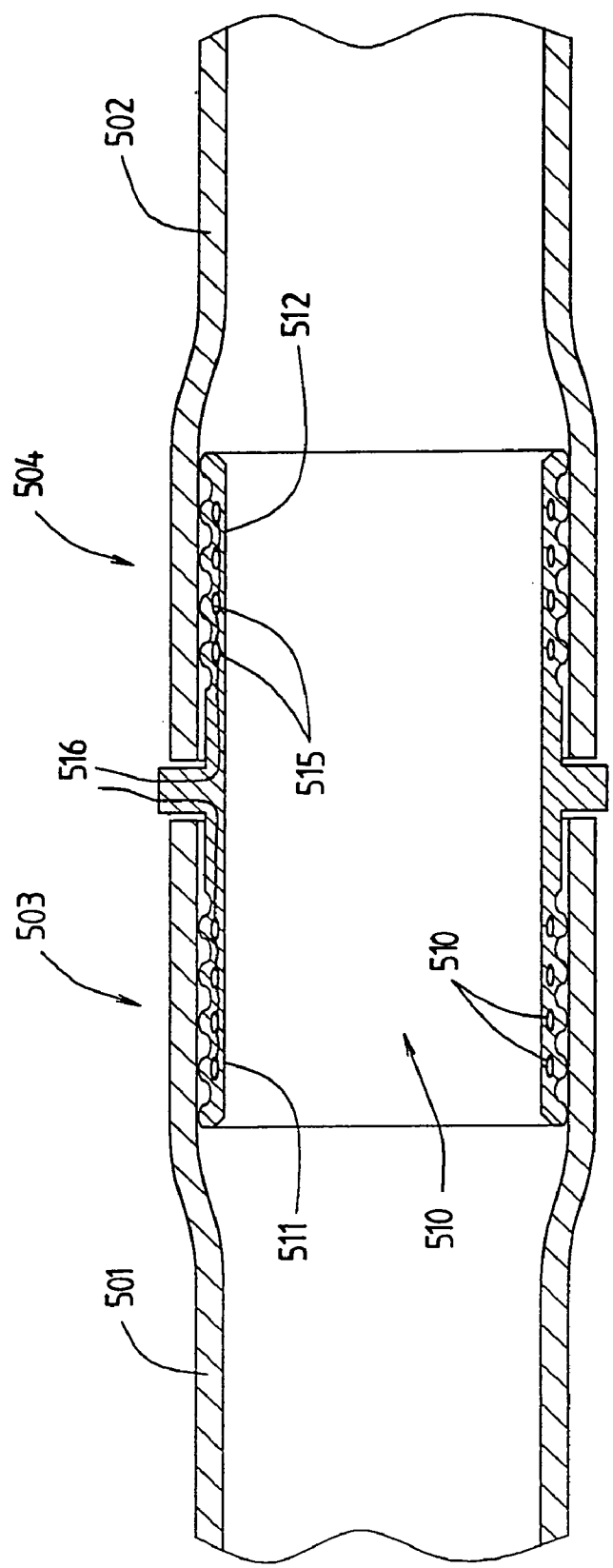
FIG. 9 shows a longitudinal section through a joint between two tubes made from biaxially oriented thermoplastic material according to the invention.

FIG. 9 shows those ends of two identical tubes 501, 502 of biaxially oriented polyethylene, for example produced using the method and installation described above, which are to be connected. Each of these tubes 501, 502 is provided at both ends with a socket 503, 504, respectively, a simple design of which, without a sealing ring, is shown in FIG. 9.

These sockets 503, 504 are, as is known per se, formed integrally on the tubes 501, 502 and in this case have a greater internal diameter than the adjoining part of the tube.

FIG. 9 also shows a plastics connecting-tube body 510, which is provided with two axial ends 511, 512, which each fit into a socket 503, 504 of a tube 501, 502 to be connected. Preferably, the connecting-tube body 510 fits into the socket with a slight clearance, as shown in FIG. 9.

The tubes 501, 502 are fixed to the body 510 by the socket of each tube being heated, with the result that the said socket shrinks at least in cross section and clamps firmly onto that end of the connecting-tube body 510 which fits into said socket.

To heat the socket which has been pushed over it, the connecting-tube body 510 is provided at each of its ends 511, 512 with heater means. These heater means in this case comprise one or more electric heater elements, for example heater wires 515, which in this case are embedded in the connecting-tube body 510 and can be connected to a current source via terminal 516 on the outside of the body 510.

In a variant, the heater means may comprise one or more elements which can be heated from the outside, for example elements which can be heated via induction or microwave radiation and are arranged on and/or embedded in the tube body 510.

To prevent the transition from the socket to the adjoining part of the tube from being heated excessively, the heater wires 515 are at a distance from the free end of the connecting-tube body 510.

It can also be seen in FIG. 9 that the outer surface at each end 511, 512 of the connecting-tube body 510 is profiled in order to create a positive form-locking connection component between the connecting-tube body 510 and the socket of the tube.

The connecting-tube body advantageously has an internal diameter which is substantially equal to the internal diameter of that part of each tube which lies outside the socket.

The connection shown can also be used for biaxially oriented tubes which have been subjected to a crosslinking treatment and/or have a multilayer tube wall, as explained above.

Axial Stretching Upstream of the Mandrel

Figure 10:
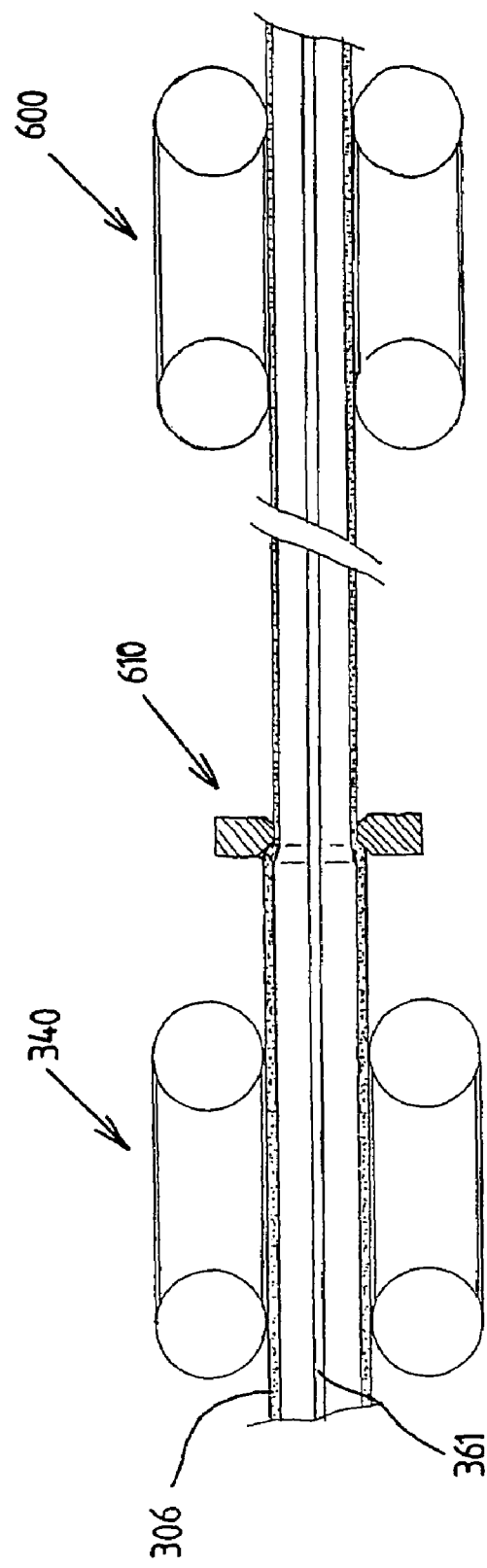
FIG. 10 shows a view corresponding to FIGS. 5a, 5b of a part of a variant of an installation for producing biaxially oriented thermoplastic tubing.

FIG. 10 shows a section of an installation for producing a tube from biaxially oriented thermoplastic material, in this example a section of the variant of the installation shown in FIGS. 5a, 5b.

FIG. 10 shows the temperature-controlled, hollow, tubular preform 306 which has come out of an extruder, and the first speed-control means 340, which is arranged downstream of the extruder and engages on the outside of the preform 306, imparting a controllable first advancement speed to this preform.

FIG. 10 furthermore shows a second speed-control means 600 which is arranged at a distance downstream of the first speed-control means 340. The second speed-control means 600 engages on the outside of the preform 306 and is designed to impart a controllable second advancement speed to the preform. The second speed-control means 600 is located upstream of the mandrel (not shown), over which the preform is forced at an orientation temperature which is suitable for the relevant plastics material. In any case, the second speed-control means 600 is located upstream of the expansion part of the mandrel.

In an embodiment which is known per se, the first speed-control means 340 and the second speed-control means 600 are each designed with a plurality of endless tracks, for example two tracks as shown in WO 95/25626, which bear against the preform. The speed-control means 340 and 600 are then also provided with a track drive with controllable speed.

In the installation, one or more third speed-control means will also be provided, located downstream of the mandrel and engaging on the stretched tube so as to define a third advancement speed of the tube.

An installation of this nature makes it possible to produce biaxially oriented tubes in a variety of ways. For example, the second speed-control means could be used to set a speed of the preform which varies between a speed lower than that of the first speed-control means and higher than that of the third speed-control means.

In particular, it is possible for the preform 306 to be axially stretched, entailing reduction of the wall thickness of the preform 306, in the section between the first and second speed-control means 340 and 600. In this case, the second speed is then higher than the first speed.

The axial stretching of the preform 306 which is produced in this section may correspond to the desired axial stretching of the tube or may form part of this stretching, in which case the remainder of the axial stretching is brought about further downstream in the installation, for example during passage over the mandrel. This has the advantage, inter alia, that the behaviour of the preform as it passes over the mandrel is stable, so that the process can be successfully controlled.

It can also be seen from FIG. 10 that the preform is moved through a calibration opening of a calibration device 610 in the section between the speed-control means 340 and 600, in which the preform is axially stretched, which calibration device 610 brings about a defined reduction in the external diameter of the preform 306. The reduction in the external diameter and possibly in the wall thickness of the preform 306 is now concentrated at the location of the calibration device 610, as can be seen from FIG. 10.

As a result of passing through the calibration device, the preform acquires a defined external diameter, which is advantageous for the engagement of the second tube speed-control means 600 on the preform and enhances the stability of the process.

By means of the speed-control means, preferably in combination with the calibration device 610, and a suitable mandrel, it is possible, for example, to ensure that the sum of stretching in the axial direction and circumferential direction is approximately 5. Tests in which tubes of biaxially stretched polyethylene are subjected to an internal pressure have demonstrated that at this value there is no creep phenomenon observed in the plastics material. At a lower value, creep was observed. A possible explanation is that at the value 5 the plastics molecules are approximately straight and thus cannot become any longer. A higher level of stretching would therefore simply lead to the more or less straight molecules sliding past one another. Preferably, the axial stretch ratio and the stretch ratio in the circumferential direction have the relationship 3:2.

What is claimed is:

1. An improved method for producing a biaxially oriented tube from thermoplastic material, wherein a tubular preform is extruded from thermoplastic material using an extruder which is provided with an extruder die having an inner core, the inner core defining an axial hollow space in the preform, wherein the preform is subjected to a temperature conditioning of the preform, so that a tempered preform is obtained having an orientation temperature which is suitable for the thermoplastic material of said preform, and wherein the tempered preform is forced over a dimensionally stable mandrel, which mandrel comprises an expansion part having an outer surface which substantially corresponds to the surface of a truncated cone, which mandrel brings about expansion of the tempered preform in the circumferential direction of the tempered preform forced over said mandrel, in such a manner that said preform is transformed into a biaxially oriented tube with thermoplastic material which is oriented in axial direction and in circumferential direction of the tube, wherein said biaxially oriented tube is cooled, the method comprising the use of a preform speed-control means which acts on the preform upstream of the mandrel and of a drawing device which is arranged downstream of the mandrel and acts on the tube, the improvement including the measure that the outer surface of the expansion part of the mandrel is provided, at a plurality of locations around the circumference of the expansion part, with elongate grooves and/or ribs which extend in the axial direction, said grooves and/or ribs causing a reduction in the wall thickness variation of the biaxially oriented tube.

2. A The method according to claim 1, wherein a film of liquid is formed between the expansion part of the mandrel and the preform.

3. A The method according to claim 1, wherein, the expansion part is provided with axial grooves which are formed at regular angular intervals in the outer surface of the expansion part.

4. The method according to claim 3, wherein the regular angular intervals are between about 3° and about 10°.

5. The method according to claim 1, wherein the grooves are at most about 5 millimeters deep.

6. The method according to claim 1, wherein the grooves are between about 0.5 and about 3 millimeters deep.

* * * * *